United States Patent
Tolkachev

(10) Patent No.: US 9,305,050 B2
(45) Date of Patent: Apr. 5, 2016

(54) AGGREGATOR, FILTER AND DELIVERY SYSTEM FOR ONLINE CONTEXT DEPENDENT INTERACTION, SYSTEMS AND METHODS

(71) Applicant: Sergey F. Tolkachev, Bloomington, MN (US)

(72) Inventor: Sergey F. Tolkachev, Bloomington, MN (US)

(73) Assignee: Sergey F. Tolkachev, Bloomington, MN (US)

( * ) Notice: Subject to any disclaimer, the term of this patent is extended or adjusted under 35 U.S.C. 154(b) by 425 days.

(21) Appl. No.: 13/785,744

(22) Filed: Mar. 5, 2013

(65) Prior Publication Data

US 2013/0239006 A1  Sep. 12, 2013

Related U.S. Application Data

(60) Provisional application No. 61/607,462, filed on Mar. 6, 2012.

(51) Int. Cl.
| | |
|---|---|
| *G06F 17/30* | (2006.01) |
| *G06N 3/02* | (2006.01) |
| *G06N 3/063* | (2006.01) |
| *G06N 3/10* | (2006.01) |

(52) U.S. Cl.
CPC .... *G06F 17/30389* (2013.01); *G06F 17/30864* (2013.01); *G06N 3/02* (2013.01); *G06N 3/063* (2013.01); *G06N 3/10* (2013.01)

(58) Field of Classification Search
CPC .................. G06F 17/30389; G06F 17/30401; G06F 17/30395; G06N 3/02; G06N 3/063; G06N 3/10; G06N 3/105
See application file for complete search history.

(56) References Cited

U.S. PATENT DOCUMENTS

| | | | |
|---|---|---|---|
| 5,197,005 A | * | 3/1993 | Shwartz et al. |
| 7,953,746 B1 | * | 5/2011 | Garg et al. .................... 707/762 |
| 2004/0054691 A1 | * | 3/2004 | Sharma et al. ............. 707/104.1 |
| 2004/0117189 A1 | * | 6/2004 | Bennett ...................... 704/270.1 |
| 2006/0026261 A1 | * | 2/2006 | Allday et al. ................. 709/217 |
| 2008/0235199 A1 | * | 9/2008 | Li et al. ............................. 707/4 |
| 2013/0013616 A1 | * | 1/2013 | Leidner et al. ............... 707/742 |

FOREIGN PATENT DOCUMENTS

WO    WO2012078074 A1   6/2012

OTHER PUBLICATIONS

Thompson, Cynthia A., Raymond J. Mooney, and Lappoon R. Tang. "Learning to parse natural language database queries into logical form." Workshop on Automata Induction, Grammatical Inference and Language Acquisition. 1997.*
Berry-Rogghe, Genevieve. "Interpreting singular definite descriptions in database queries." Proceedings of the second conference on European chapter of the Association for Computational Linguistics. Association for Computational Linguistics, 1985.*
Tolkachev, S. Neural Programming, Information Amplification and Interactive Search. St. Petersburg-Minneapolis by Sergey Tolkachev, 2007. (Machine translation of Russian to English version.).

* cited by examiner

*Primary Examiner* — William Spieler
(74) *Attorney, Agent, or Firm* — IPLM Group, P.A.

(57) ABSTRACT

A method of providing information to a user is provided. The method includes; establishing an user system interface between a client device and an information system; processing informal queries input from the client device with at least one neural network that converts the informal queries from the client device into formal queries; storing interface context in a browser of the client device, the interface context created in forming formal queries from informal queries, wherein the client device contains unique interface context in the client device's browser that is secure to the client device, the interface context aiding in the determination of future formal queries from future informal queries; searching at least one database in response to the formal queries; and providing responses to the informal queries processed by the neural network to a user through the client device.

20 Claims, 33 Drawing Sheets

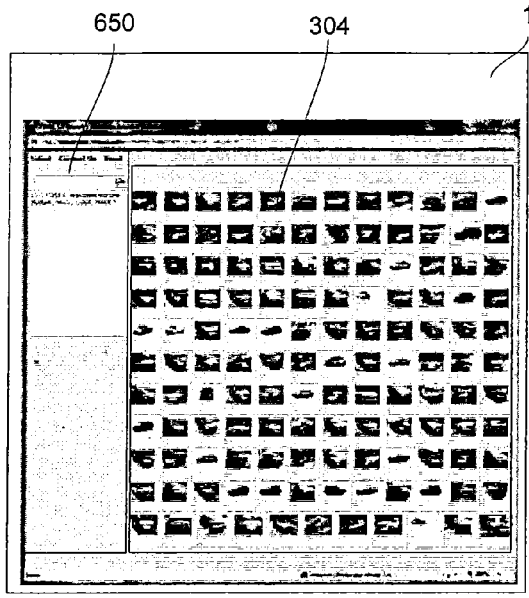
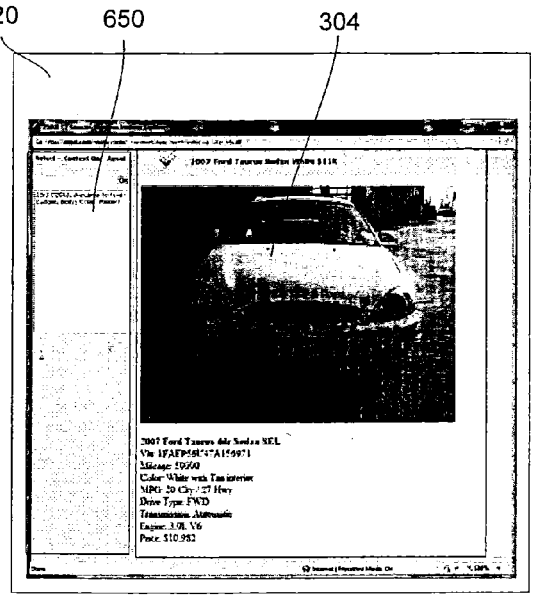
FIG. 11A  FIG. 11B
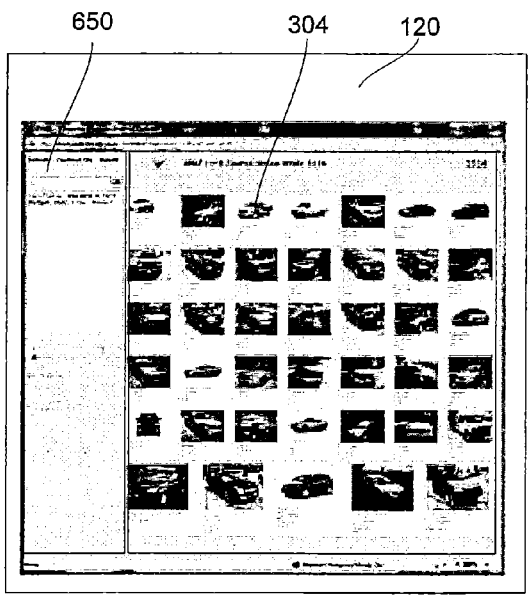
FIG. 11C

XML Definition of
Neural Components

```xml
<?xml version="1.0" encoding="UTF-8"?>
<!DOCTYPE neuro_triggers>
<neuro_triggers name="Neuro Layer 1">
    <neuro_trigger name="Help"> </neuro_trigger>
    <neuro_trigger name="Slide Show"> </neuro_trigger>
    <neuro_trigger name="Price"> </neuro_trigger>
    <neuro_trigger name="Trade-In"> </neuro_trigger>
 + <neuro_trigger name="Type">
 + <neuro_trigger name="Year">
 - <neuro_trigger name="Color">
     + <state name="Black">
     - <state name="Red">
         <item weight="1" word="red"/>
         <item weight="1" word="ruby"/>
         <item weight="1" word="maroon"/>
         <item weight="1" word="burgundy"/>
         <item weight="1" word="merlot"/>
         <item weight="1" word="красный"/>
         <item weight="1" word="красная"/>
         <item weight="1" word="красные"/>
     </state>
     + <state name="White">
     + <state name="Beige">
     + <state name="Gray">
     + <state name="Tan">
     + <state name="Silver">
     + <state name="Blue">
     + <state name="Sage">
     + <state name="Green">
     + <state name="Pewter">
     + <state name="Flint">
    </neuro_trigger>
 + <neuro_trigger name="Engine">
 + <neuro_trigger name="Interior">
 + <neuro_trigger name="Model">
 + <neuro_trigger name="Make">
 + <neuro_trigger name="Body">
 + <neuro_trigger name="Hybrid">
 + <neuro_trigger name="DriveTrain">
 + <neuro_trigger name="Transmission">
 + <neuro_trigger name="Certified">
 + <neuro_trigger name="Mileage">
</neuro_triggers>
```

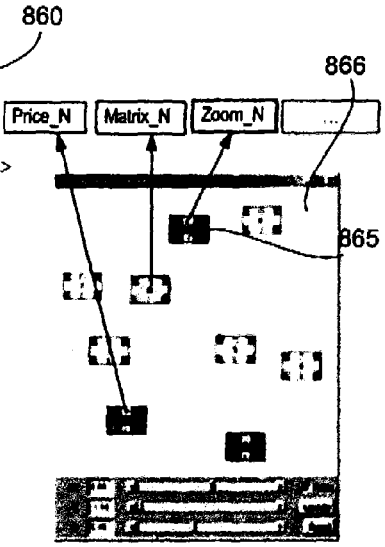

Layer with Fuzzy
Linguistic Variables

Layer with Neural Trigger

FIG. 21A

AGGREGATOR, FILTER AND DELIVERY SYSTEM FOR ONLINE CONTEXT DEPENDENT INTERACTION, SYSTEMS AND METHODS

CROSS-REFERENCE TO RELATED APPLICATIONS

This application claims priority to U.S. Provisional Application Ser. No. 61/607,462, same title herewith, filed on Mar. 6, 2012, which is incorporated in its entirety herein by reference.

BACKGROUND

Contemporary internet search software programs or tools provide indexing, categorization and representation of search results based on search terms provided by a user. In addition, such tools commonly provide for "frequently asked questions" support, which may commonly be presented as predetermined lists of common inquiries and the answers, as well as user "help" functions related to aiding users in the use of particular, narrowly defined tasks. Such tools utilize central servers to search and categorize as much information on the internet or other data sources as the tool can access. The tool then processes the information with the servers to provide results. Since some data changes at a relatively high frequency, a search provided by the tool may not provide completely current information.

The issue of not providing the current information is less of a concern for "external or surface" web services, such as web pages which are designed and intended to be utilized by a general population of users. Such "external" information may tend to be relatively static in composition and location, allowing the information and location to be found and categorized by search tools. The faster "external" web or data sources change, the less likely the search tools may tend to find and categorize the information before a search desires to find and utilize the information. However, the relatively static nature of "external" web information means search tools remain effective for such "external" sources.

"Internal or deep" web or data sources, however, may tend to be relatively, even significantly less static than "external" sources. "Internal" sources include information not necessarily intended for broad, unregulated public consumption, such as propriety databases and the like. For instance, a database of inventory for a sales company may be subject to rapid change. For a large company, the database may incorporate millions of entries and may provide thousands of changes per minute. Such a relatively dynamic environment may not be conducive to conventional Internet search tools which are oriented to more static, "external" data sources, as it may be impractical or impossible for the tool to keep the information sufficiently current for use.

In addition, developments in networking technology have started to impact the nature of the devices which utilize networking services. Increasingly, smartphones, tablets, televisions and radios incorporate networking capabilities in addition to, or in place of, networking capabilities provided by computers. As such devices utilize different capabilities for nominally different purposes, utilizing such devices in conjunction with one another may not be seamless.

Furthermore, to whatever extent Internet search tools and compatible devices do collect and provide access to Internet-based data, searching such data may be comparatively constrained. Traditionally, Internet search tools utilize statistical models of estimation and ranging to select the most statistically probable subset of data for the query. To whatever extent two users input the same query, the same result will be arrived at and provided. Consequently, many Internet search tools are not sensitive to queries each user may previously have asked and how such previous queries may reveal the desired information from the current query.

For the reasons stated above and for other reasons stated below which will become apparent to those skilled in the art upon reading and understanding the present specification, there is a need in the art for an effective and efficient method of providing information to a user from a deep web and forming an effective and efficient interface.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a method of providing information to a user is provided. The method includes; establishing an user system interface between a client device and an information system; processing informal queries input from the client device with at least one neural network that converts the informal queries from the client device into formal queries; storing interface context in a browser of the client device, the interface context created in forming formal queries from informal queries, wherein the client device contains unique interface context in the client device's browser that is secure to the client device, the interface context aiding in the determination of future formal queries from future informal queries; searching at least one database in response to the formal queries; and providing responses to the informal queries processed by the neural network to a user through the client device.

In another embodiment, another method of creating an information system is provided. The method includes; loading a neural core on a browser of a user device, the neural core being an interpreter for a neural network; interpreting a user query entered into the user device with a neural network; accessing a deep web in determining a response to the user query; and providing the response to the user query on an output device.

In still another embodiment, a method of forming an user system interface is provided. The method includes; providing a unique identifier with a presentation component to be displayed on at least a first output device with an application; capturing the unique identifier with a client device; sending the captured unique identifier to the application; matching the unique identifier; and establishing an interface between the at least one output device and the client device based on the matched unique identifiers with the application.

BRIEF DESCRIPTION OF THE DRAWINGS

The present invention can be more easily understood and further advantages and uses thereof will be more readily apparent, when considered in view of the detailed description and the following figures in which:

FIGS. 11A, 11B and 11C are further illustrations of different displays on an output device from a deep web of one embodiment of the present invention.

FIG. 21A illustrates a XML definition of linguistic and fuzzy elements of an embodiment of the present invention;

In accordance with common practice, the various described features are not drawn to scale but are drawn to emphasize specific features relevant to the present invention. Reference characters denote like elements throughout Figures and text.

DETAILED DESCRIPTION

Figure 1:
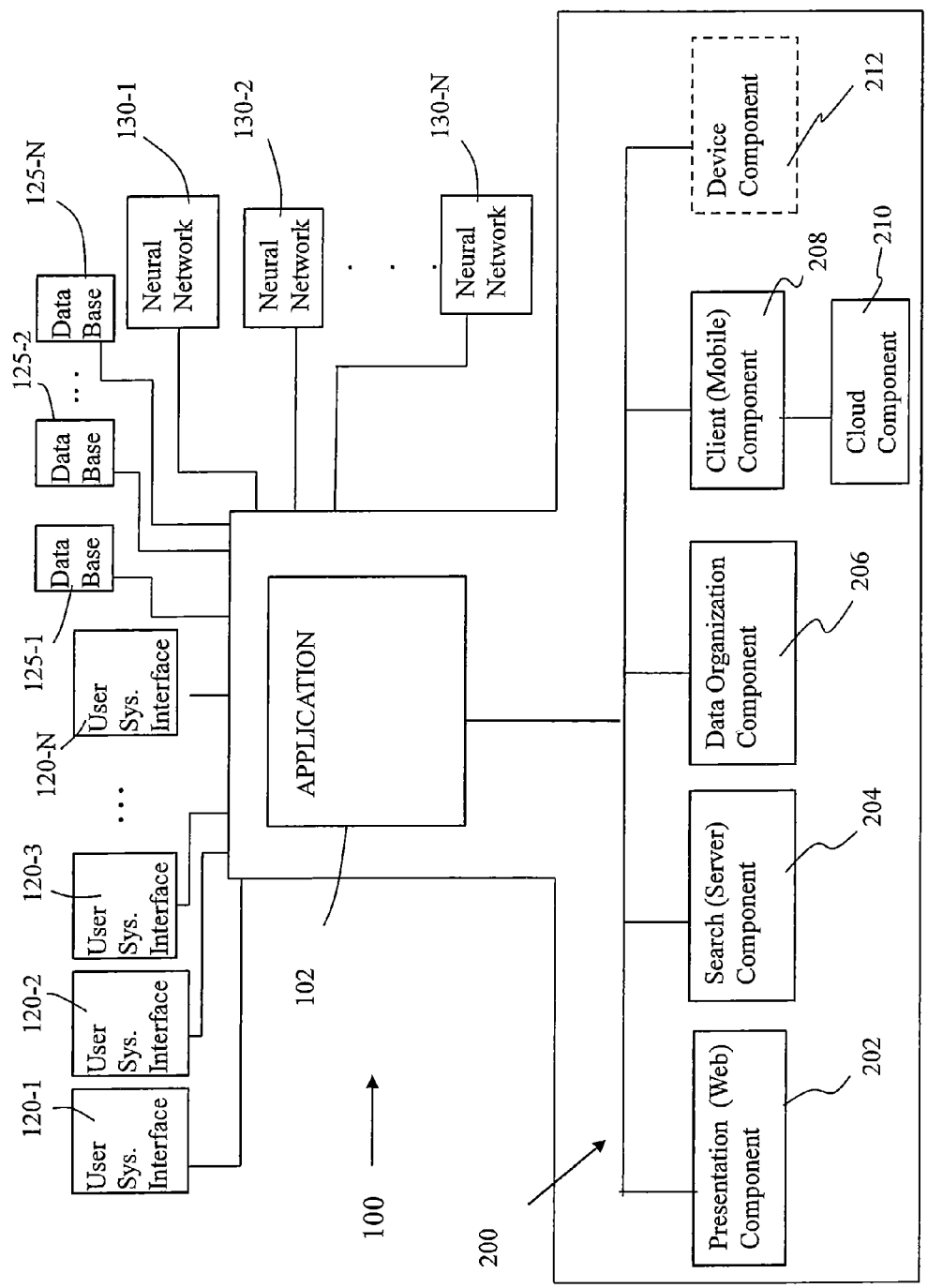
FIG. 1 is a block diagram of an online information system of one embodiment of the present invention.

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide an application or tool which utilizes multiple functions to integrate the functionality of multiple networking platforms and devices with context-sensitive, conversational queries. The application may provide search and user help functions based on such context-sensitive, conversational queries. Such applications may be particularly well adapted to activities related to relatively dynamic "internal" networks. In various embodiments, neural networks contribute to the effectiveness of the application.

In particular, the application provides the ability for a variety of users to interact with network information or data sources concurrently, with each user potentially utilizing more than one interface device. One such interface device, such as a smartphone, may be utilized to create a unique session by pairing with another interface device, such as a display screen which may be used by a computer or a television. Other users may utilize different interface devices to create concurrent unique sessions through interface device pairing. Interaction within one unique session by one user may impact the data provided to another user in another session.

Computing resources among the interface devices and a central server may combine to operate multiple parallel functions relating to searching for data, presenting data and interacting between and among the interface devices and the central server. The functions may be selectable based on the circumstances to which the application is applied. Some or all of the functions may incorporate neural networks to promote efficient searching, display of information, inputting of user queries and dialogue with the user based on the searching and user queries.

In various embodiments, neural networks may contribute to allowing searches that are context sensitive based on previously posed queries. Neural networks may also allow for queries utilizing conversational language which may be relatively more easily received and utilized for searching. In addition, neural networks may provide for interactive and intuitive presentation of data to the user. As described below, in embodiments, a provider through an author (expert) will control the neural editor's flowcharts and all neural networks' structures in the form of XML documents, but the user will own "the state" of the neural networks. This system allows clear protection of the user's privacy.

Referring to FIG. 1, a block diagram of an online information system 100 is illustrated. The information system 100 includes an application 102. Application 102 implements multiple components or layers. The multiple components or layers are generally described as function components 200. The function components 200 are directed towards providing, at least in part, certain functions of application 102. Function components 200 operate in parallel and substantially concurrently to provide functions of the application 102. In various embodiments, function components 200 are selectable and independently configurable, dependent on the nature of application and the task to which the application is applied. In the illustrated embodiment of FIG. 1, the function components 200 available to the application 102, in this example, includes a presentation component 202, a search or "editor" component 204, a data organization or "notes" component 206, a client or "mobile" component 208, a "cloud" component 210 and an optional "device" component 212.

Function components 202, 204, 206, 208 and 210 will be discussed and illustrated in detail below. Briefly, however, presentation component 202 is configured to establish unique user sessions for each user system interface 120 (1-N) which utilizes application 102 and to maintain the context of prior user interactions with application 102, including the context of queries by the user system interface 120 (1-N). Search component 204 is configured to manage the interaction between queries and information included in the network to be searched by creating associations between different queries and the available data in databases 125 (1-N). Such associations may, in various embodiments, be accomplished utilizing a first neural network 130-1. Data organization component 206 organizes and classifies data returned by search component 204 based on the data received and the context of prior user queries. Such organization and classification may occur by utilizing a second neural network 130-2. Client component 208 is configured to facilitate operation of application 102 on a client interface 120 (1-N) of a user, such as a smart phone, tablet computer, personal computer, and other computing devices 120. Client component 208 may incorporate "cloud" component 210 which permits computing functions to occur in a variety of potential locations dependent on computing resources. Moreover, the client component 208 may be implemented as a third neural network 130-N to facilitate coordination between different devices. The optional device component 212 (device layer) is used to facilitate interaction between other layers 202, 204, 206 and 208 and interface devices as will be discussed in detail below.

Figure 2:
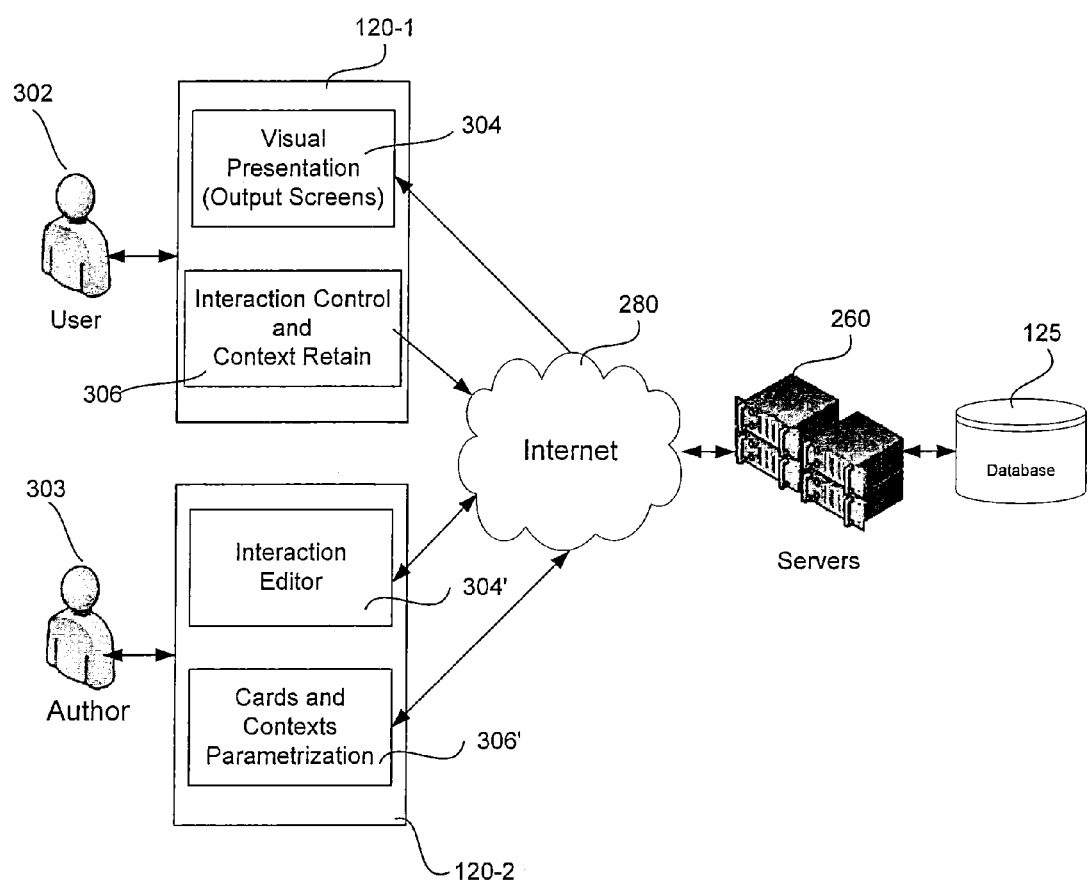
FIG. 2 is a diagram of a system level function of an application of one embodiment of the present.

FIG. 2 illustrates the function of the application 102 on a system level. Users 302 and 303 may concurrently interface with application 102, which may, in various embodiments, be native to server 260 or may be distributed on multiple locations within a network or Internet 280. In various embodiments, server 260 is a conventional server well known in the art. Alternatively, server 260 may be proprietary equipment, in certain embodiments configured to optimize application 102. Server 260 may be configured to provide application 102 for search and user help functions on an "internal" network as well as an "external" network, as described above. Both an "internal" process and an "external" process may be provided functionally concurrently.

A database, generally designated as 125, provides "internal" information or data accessed and modified by application 102. Each user 302 and 303, upon initiating an instance of application 102, obtains a separate and unique identifier. For example, the user system interface 120-1 of user 302 would be assigned a separate and unique identifier that would distinguish it from the unique identifier associated with the user system interface 120-2 of user 303 and every other user system interface 120-3 through 120-N currently using the system. In some embodiments, a user system interface, such as user system interface 120-1 and 120-2 incorporates at least one presentation or output device 304, 304' and at least one client device 306, 306'.

While each device 304, 304', 306 and 306' may be any computing device with a user interface, in certain embodiments output device 304, 304' may include a user interface where any computing power is merely incidental, such as a television or display. In such embodiments, client device 306, 306' may be a device which at least incorporates the ability for a respective user 302 and 303 to input information as well as have information displayed, such as a smart phone, tablet computer or personal computer. In various embodiments, a user, such as user 302 of FIG. 2, merely utilizes application 102 native to server 260 for information while another user, such as user 303 is an author or administrator of application 102. This may include a user 303 who inputs information to database 125 and sets parameters for the operation of application 102. In such embodiments, user 302 may utilize an user system interface 120-1 which incorporates display capabilities, such as a television or computer display, while any resident data entry functionality of user system interface 120-1 may be disabled or limited to prevent user 302 from causing undesired changes to application 102. In such embodiments, user 303 (administrator) may utilize an user system interface 120-2 which includes both display capabilities and data entry capabilities, such as a personal computer, to facilitate modifications to application 102.

Figure 3:
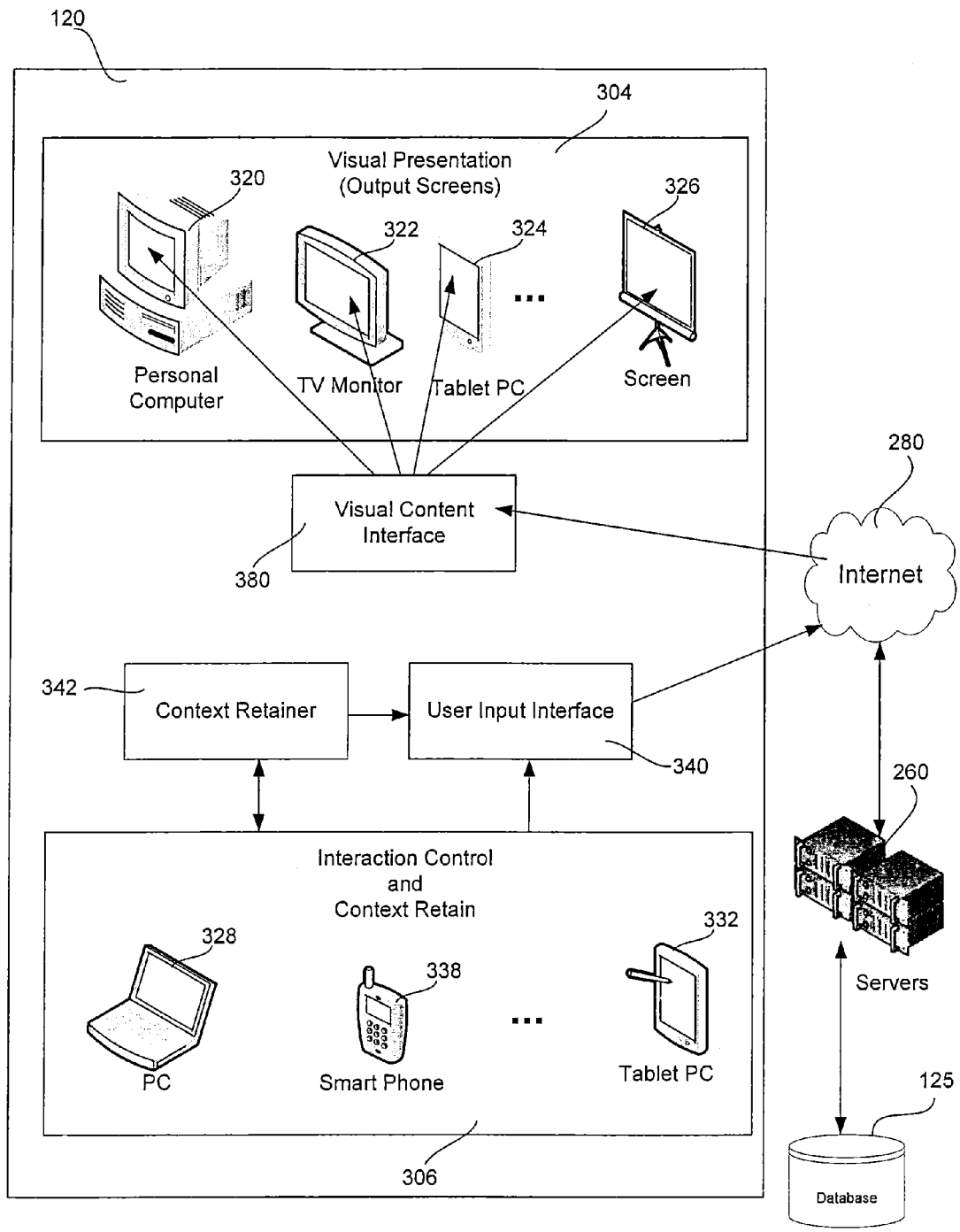
FIG. 3 is a diagram of a user system interface of one embodiment of the present invention.

FIG. 3 further illustrates a user system interface, generally designated as 120, of one embodiment in conjunction with server 260, internet 280 and database 125. In the illustrated embodiment, application 102 displays information on at least one output device 304 corresponding to user 302 in FIG. 2. In this embodiment, only one output device 304 is utilized, while in alternative embodiments more than one output device 304 will be utilized for each unique system interface. In certain embodiments, each output device 304 corresponds to one and only one user system interface 120. However, once the particular user 302 corresponding to user system interface 120 ends the session with application 102 via user system interface 120, output device 304 may be assigned to a new user system interface, such as user system interface 120-2 for a different user 303 (illustrated in FIG. 2) or may be utilized to initiate a new user system interface 120-N, as discussed in detail below.

Visual content interface 380 provides control of content displayed on an output device or output devices 304, such as personal computer screens 320, TV monitors 322, tablets 324 and other types of display screens 326. Visual content interface 380 is coupled to server 260 and database 125 by way of internet 280. Visual content interface 380 may be controlled, at least in part, by at least some of the presentation component 202, the search component 204 and the data organization component 206 (illustrated in FIG. 1). Additionally, to the extent that output device 304 incorporates computing functionality, client component 208 and/or cloud/device component 210 (as shown in FIG. 1) may further operate to control or utilize such computing functionality to run application 102.

User input interface 340 and context retainer 342 of the user system interface 120, of FIG. 3, provide control for and are controlled by client device 306. User input interface 340 provides at least partial control by user 302 of application 102, as well as the capacity to initiate a unique user session with application 102 by creating unique interface with the user system interface 120 of the user 302. In various embodiments, client device 306 obtains a unique identifier from output device 304 and associates the unique identifier for output device 304 with a unique identifier from client device 306 to create a unique pair which is communicated to server 260 via user input interface 340 for the establishment of unique user system interface 120 for user 302. In an embodiment, output device 304 displays a unique identifier, such as but not limited to, a barcode, which may be read by an optical component of client device 306, such as a camera commonly found on smart phones 338, tablet computers 332, personal computers 328 and the like. Once, the client device 306 has the unique identifier of the output device 304, the user input interface 340 establishes the user system interface 120.

Once a user system interface 120 (communication link) has been established, user input interface 340 may be utilized to receive user commands from client device 306 for interacting with application 102. In various embodiments, user input interface 340 is utilized at least in part by client component 208 and device component 212. Context retainer 342 may be utilized by any of components 200 (layer) for the establishment, maintenance and use of context as created by use of application 102 by user 302. Context refers to awareness of previously asked questions, user 302 preferences and actions and the results of previous queries. Particularly those components 200 incorporating the use of neural networks 130 (1-N), including, in certain embodiments, search component 204, data organization component 206 and client component 208, may maintain and utilize context to aid in answering queries and the presentation of information to user 302. Context retainer 342 and the use of neural networks 130 (1-N) generally may provide an ability for user 302 to enter queries as conversational language rather than as keyword searches. Visual content interface 380, user input interface 340 and context retainer 342 may be located in various physical or logical locations within system interface 120. Alternatively, some or all of components 380, 340 and 342 may be located within server 260 and internet 280, or between user system interface 120, server 260 and internet 280.

Figure 4:
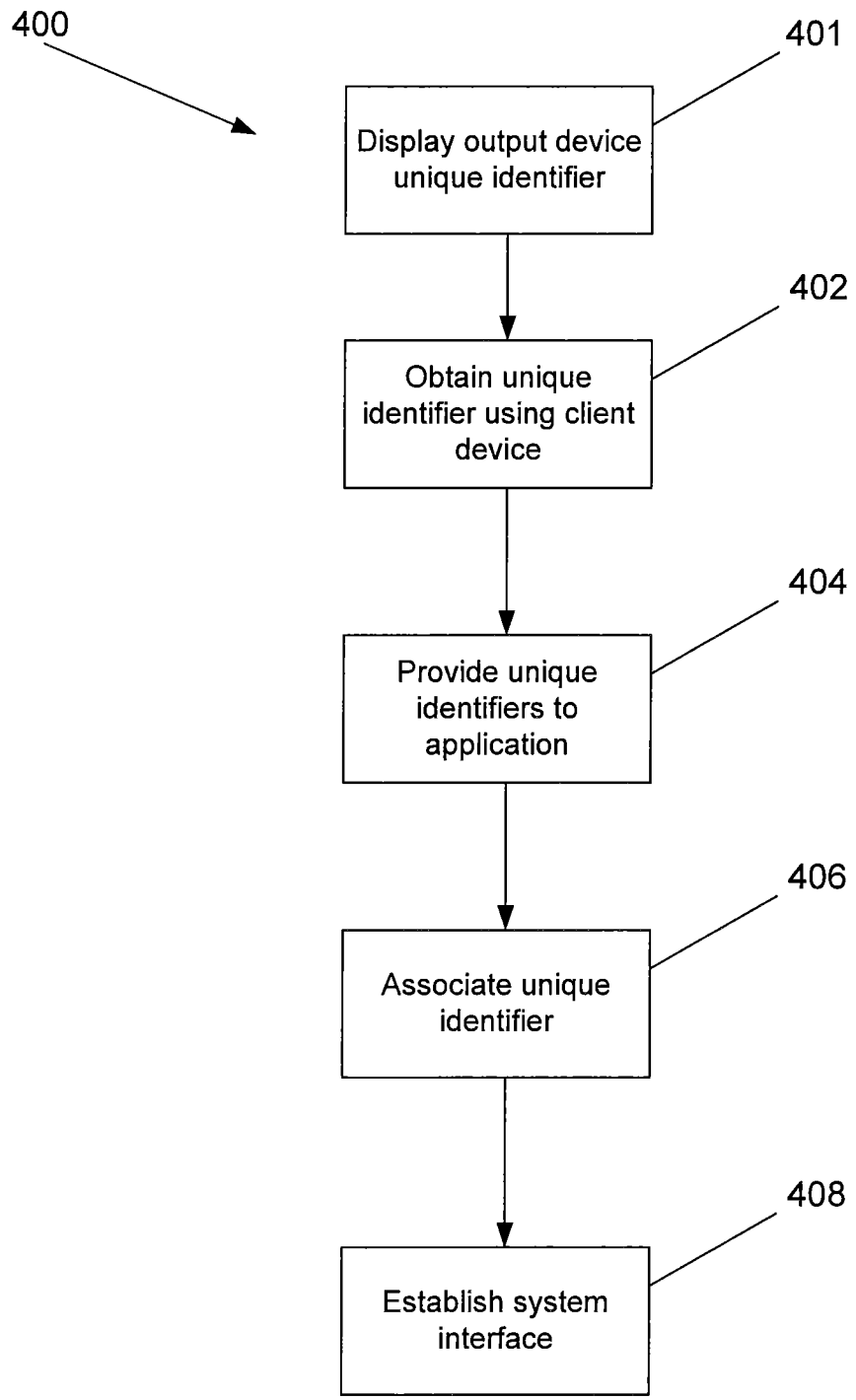
FIG. 4 is an interface establishment flow diagram of one embodiment of the present invention.

Referring to FIG. 4, interface establishment flow diagram 400 of one embodiment is illustrated. This flow diagram illustrates one way of establishing an interface to allow user 302 to utilize application 102. Application 102 running on server 260 displays a unique identifier, such as but not limited to, a barcode on output device 304 (401). User 302 utilizes client device 306 to obtain the unique identifier displayed on output device 304, such as by obtaining an image of the unique identifier using a camera component of client device 306 (402). The unique identifier of output device 304 is provided for application 102 along with a unique identifier of client device 306, for instance by transmitting both unique identifiers to application 102 via Internet 280 (404). Application 102 associates the unique identifier of the output device 304 with the unique identifier of client device 306, thereby pairing output device 304 with client device 306 for the purposes of utilizing application 102 (406). User system interface 120 is established and client 302 is permitted to utilize at least some of the functions of application 102 (408). Upon being paired, output device 304 may not, in various embodiments, be paired with any other client device 306 until user 302 or application 102 terminates the association between output device 304 and client device 306.

Figure 5:
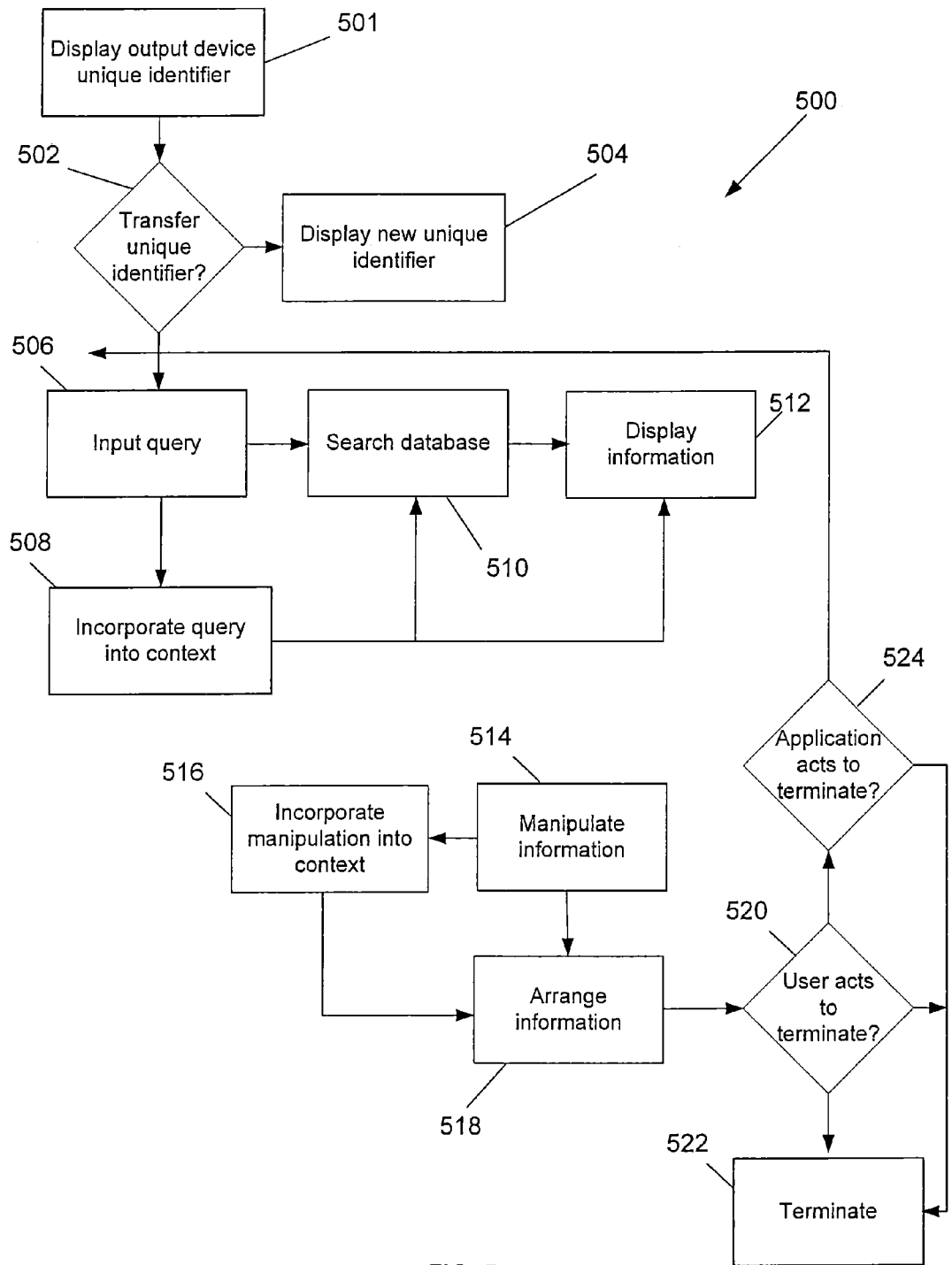
FIG. 5 is an operation flow diagram illustrating an operation of the application on a user system interface of an embodiment of the present invention.

FIG. 5 is an operation flow diagram 500 that illustrates an operation of application 102 on a user system interface 120-1 of an embodiment. Presentation component 202 of the application 102 displays information on output device 304 relating to a unique identifier which application 102 associates with and provides to output device 304 (501). In various embodiments, upon user system interface 120-1 having been established (see FIG. 4), application 102 may be utilized, either by a user 302 command or by a device component 212, incorporating a different output device 304' into user system interface 120-2 by transferring the unique identifier for output device 304 to output device 304'(502). Such an operation may occur in the event that user 302 pairs with a first output device 304, such as a public display screen, and is then moved to a second output device 304', such as a private display screen, to interface with application 102. In such embodiments, presentation component 202 or device component 212 would transfer the unique identifier to output device 304' for operation in user system interface 120-2. Presentation component 202 would then display a new unique identifier on first output device 304 to permit the creation of a new user system interface 120-3 with a new user (504).

Upon a user system interface 120 having been established, user 302 can input (506) a query via client layer component 208 on client device 306. Presentation component 202 incorporates the query within the context of user's 302 use of application 102 (508). That is, every user's query is a combination of the user's input and the then current context. Search component 204 searches database 125 on the basis of the query and the context as established by presentation component 202 (510). Data organization component 206 displays information returned by search component 204 at least on output device 304 (512). In an embodiment, the information being organized is at least in part based on the basis of context as provided by presentation component 202.

User 302 utilizes client device 306 and client layer component 208 to manipulate the displayed information and the arrangement of the information on output device 304 (514). Presentation component 202 incorporates the user's manipulation into the context of the user's use of application 102 (516). Data organization component 206 utilizes user's manipulation as well as the context to arrange the information on output device 304 (518). User 302 may interactively input (506) new queries and manipulate information (514) with the presentation component 202 (508, 516) incorporating such activities into the context of user's 302 use of application 102 and data organization component 206. A result of the new queries and manipulation is displayed (512, 518) on output device 304 accordingly. Such interactive use of application 102 via user system interface 120 may continue until either user 302 acts (520) to terminate (522) the user system interface 120, such as via client device 306 and client component 208, or application 102 acts (520) to terminate (522) user system interface 120, for instance through user 302 inactivity for an extended period of time.

Figure 6:
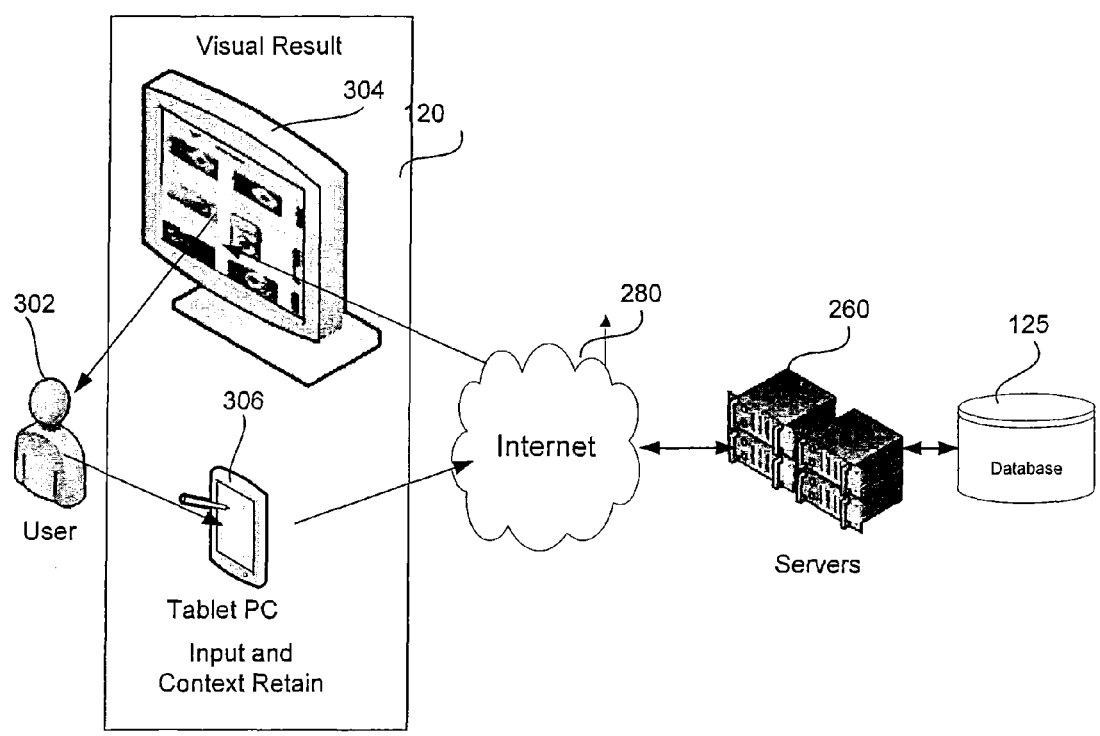
FIG. 6 illustrates a formed user system interface of an embodiment of the present invention.
Figure 7:
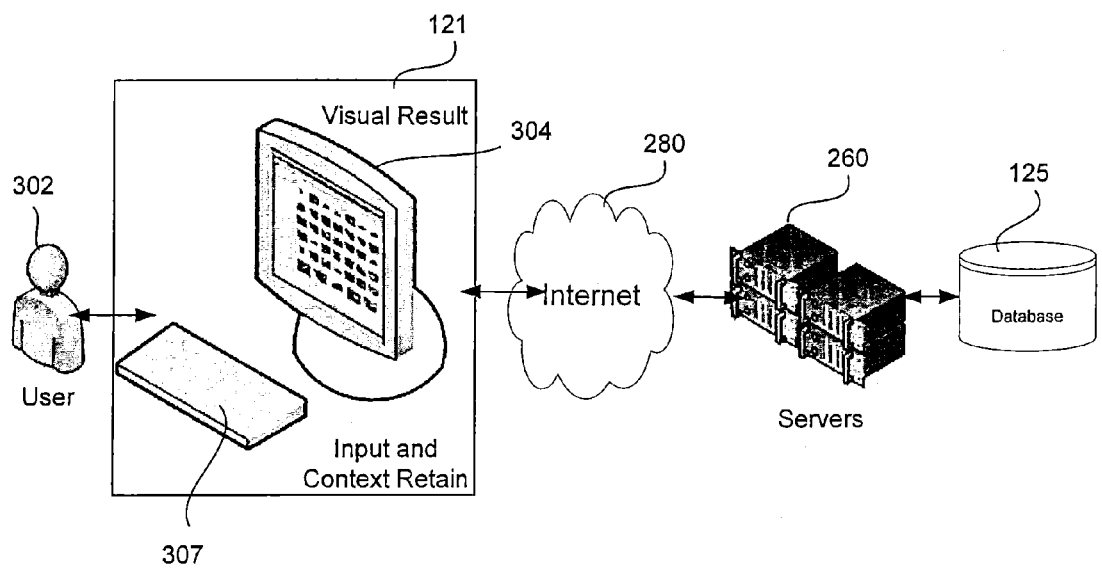
FIG. 7 illustrates another formed user system interface of an embodiment of the present invention.

FIG. 6 illustrates an example of a formed user system interface 120 of an embodiment. In this example embodiment, a user inputs a query into the client device 306 which in this example is a tablet PC. The query is communicated to the server 260 via the internet 280 in this example embodiment. The application 102 implements its components and accesses the database 125 as needed to draft a response to the query as described above. Due to the pairing, as described above, the presentation component 202 of the application 102 displays the response on the output device 304 which in this example, is a screen. The system will also work when an unassociated client device 306 is not used, such as shown in FIG. 7. In this embodiment, the user 302 simply enters the query on a keyboard 307, or the like, that is already associated with an output device such as a computer screen 304. In this embodiment, since an user interface 121 is already present, one does not need to be created by the application 102.

Figure 8:
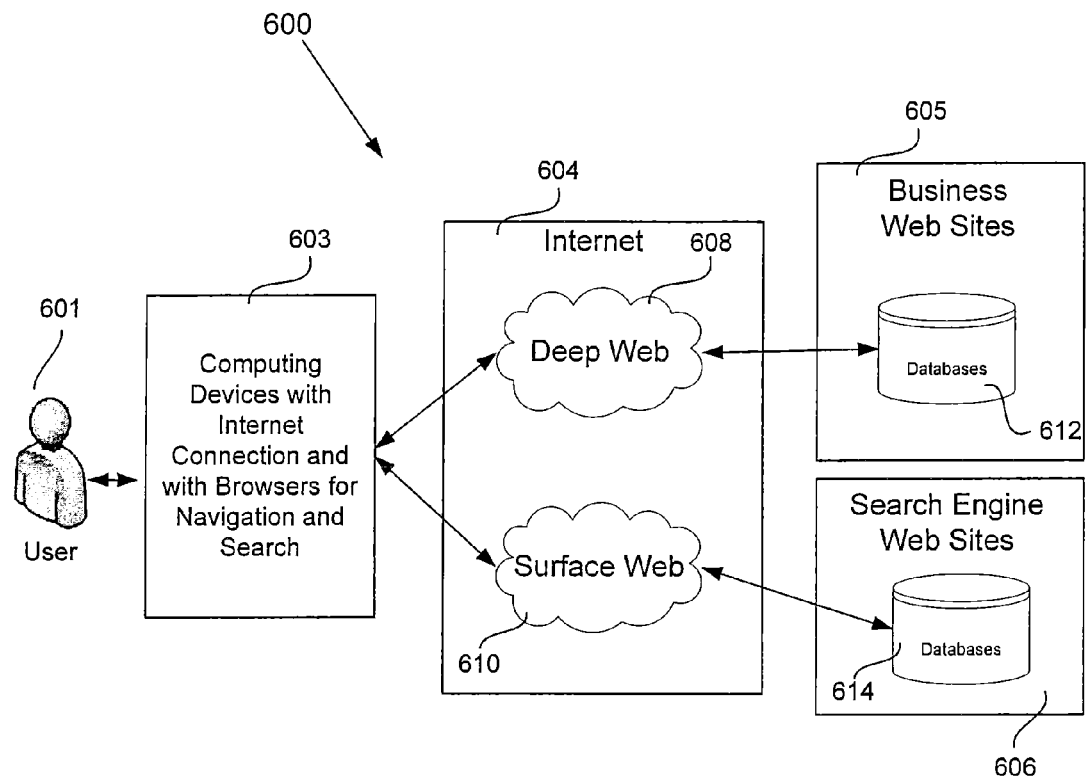
FIG. 8 is a process flow diagram of an embodiment of the present invention.

FIG. 8 is a process flow diagram 600 illustrating how one embodiment works. The user 601 in this embodiment desires information about a product or service provided by a business contained in the business's web sites 605. The user presents an informal query regarding the products or services with one of a variety of devices 603 with internet connection and with browsers for navigation and search. The devices 603 may include, but are not limited to, personal computers, smart phones, web TVs, etc. that are connected to the internet and capable of accessing user's 601 inputs in a variety of forms (text, voice, gesture, geo location, etc.). The internet 604 is the medium to transfer messages from/to the user 601 and desired source information. The internet 604 includes both the surface web 610 and the deep web 608. The surface web 610 allows for the specific business URL address by querying search engine 606 with index database 614. That is, a search engine 606 such as Google, Yahoo, etc. provides business addresses and general information about products and services with index database 614. The deep web 608 allows access to a business's internal dynamic content database 612. Business database 612 contains usually unique content (structure and data) specific for a particular business domain. Being able to access the deep web 608 is provided with embodiments by creating a neural core inside a web page (as described below) that resolves semantic ambiguity associated with such access. Semantic ambiguities are present because meaning can only be resolved in a context that is simply unavailable and unknowable when looking at individual links. Embodiments take advantage of the fact that modern web pages can be used as a virtual PC (includes Javascript interpreter (CPU), local memory, input and output and communication channels). In embodiments, as described below, case context-sensitive, conversational queries in a self-modifiable environment, such as a web page, are used to access the content in the deep web 608.

Figure 9:
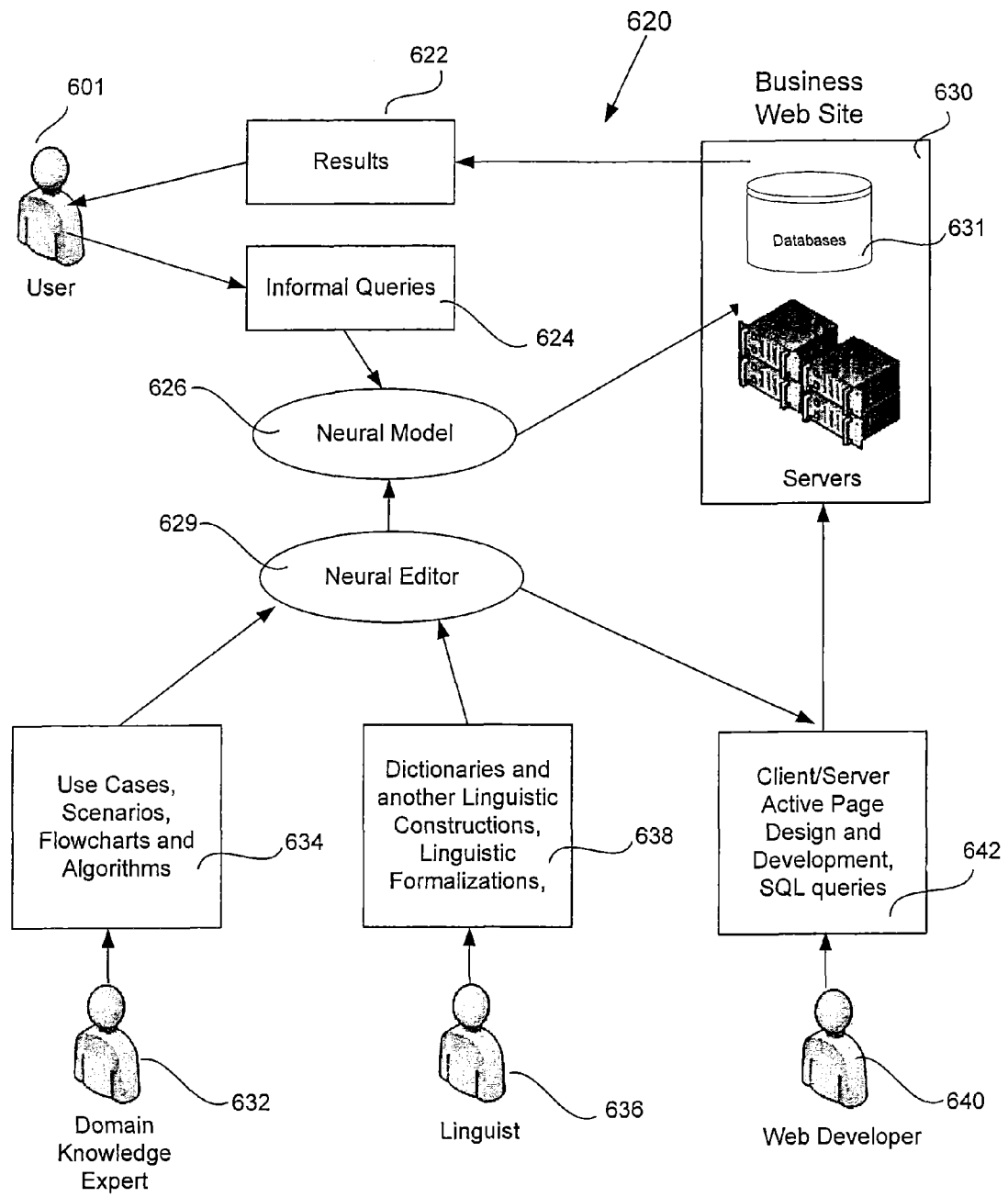
FIG. 9 is another process flow diagram of an embodiment of the present invention.

FIG. 9 is another process flow diagram 620. The user 601 provides an informal query 624. The informal query 624 must be converted into a formal query to a specific database, such as database 631 in business website 630. The user 601 expects to obtain results 622 in an optimal way, with a minimal number of clicks, avoiding repeatable questions and useless (garbage) information. Informal queries, which can be a continuous conversational stream of words and clicks, such as "looking for a red used-car"; "can you show me a better one"; "I like this, show me a similar", etc., which cannot be directly converted into the formal query to the database 631 must be in a form of: "Select . . . From . . . Where . . . ." Embodiments convert the informal query into a formal query using a neural network. The neural network uses information provided by three sources in converting the informal query into the formal query. The first source is a knowledge expert 632. The knowledge expert 632 provides an initial informal knowledge model, using cases, diagrams and flow charts 634 which are converted into the neural model 626 through neural editor 629 of the neural network. The second source is a linguist 636 that provides common and specific linguistic knowledge and help 638 to convert the expert's knowledge into the neural model 626 used by the neural editor 629. The third source is a web developer\designer 640 which creates in some ports specific business website, such as website 630 of FIG. 9. The web developer\designer 640 uses the neural model 626 and neural editor 629 to develop formal queries 642 for the business database 631 and to incorporate all specifically designed interfaces from the active webpage on the client side to the server side. The neural editor 629 is used for building a conversational model of the user's interaction with specific business content. The neural model 626 is an active component that recognizes and keeps the context of interaction between user 601 and the business website 630. The neural model 626 is located in the user's (client) side and provides contextual information helping to build more efficient formal queries to database 631. The business website 630 will include dynamic content that allows access to the internal business data with unique context (structure and data) specific for a particular business domain. Results 622 provided back to the user 601 from the business website 630 via 620 may be used by the user 601 to continue the search. For example, in response to results 622 that the company has a particular car, the user may ask a follow up question such as, "I like this car, but do you have a similar one in red color."

Figure 10A:
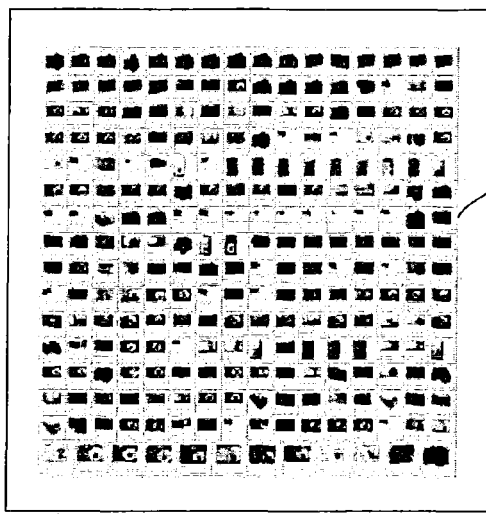
FIGS. 10A, 10B and 10C are illustrations of data and organization of data as presented on an output display device of embodiments of the present invention.
Figure 10B:
Figure 10C:
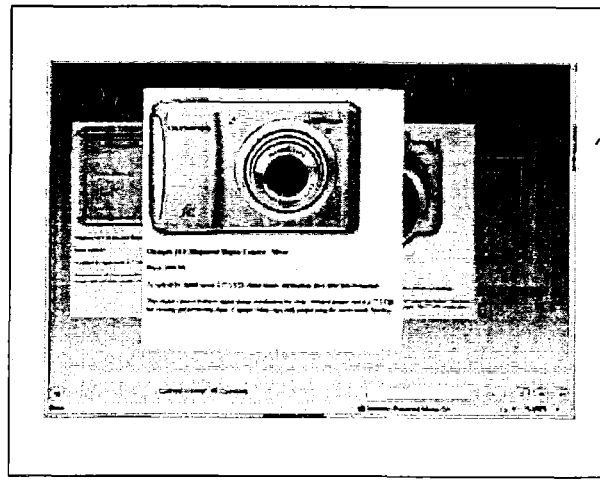

FIGS. 10A, 10B and 10C are illustrations of data and organization of data as presented on an output display device 645 and as created by data organization component 206 in view of context provided by presentation component 202. In this example, the user 601 has been given access to the deep web (corporate data) in a business web site. FIGS. 11A, 11B and 11C are a further representation of different displays on output device 304 from a deep web. In each illustration, on the left of the screens, a query screen 650 allows for input by the user. Based on the information provided in the query screen 650, information is obtained and processed by presentation component 202 and the resulting data organized by data organization component 206 and presented on the center and right of the display of the output display device 645. The information as organized by data organization component 206 may be a byproduct of a query performed by search component 204.

Figure 12:
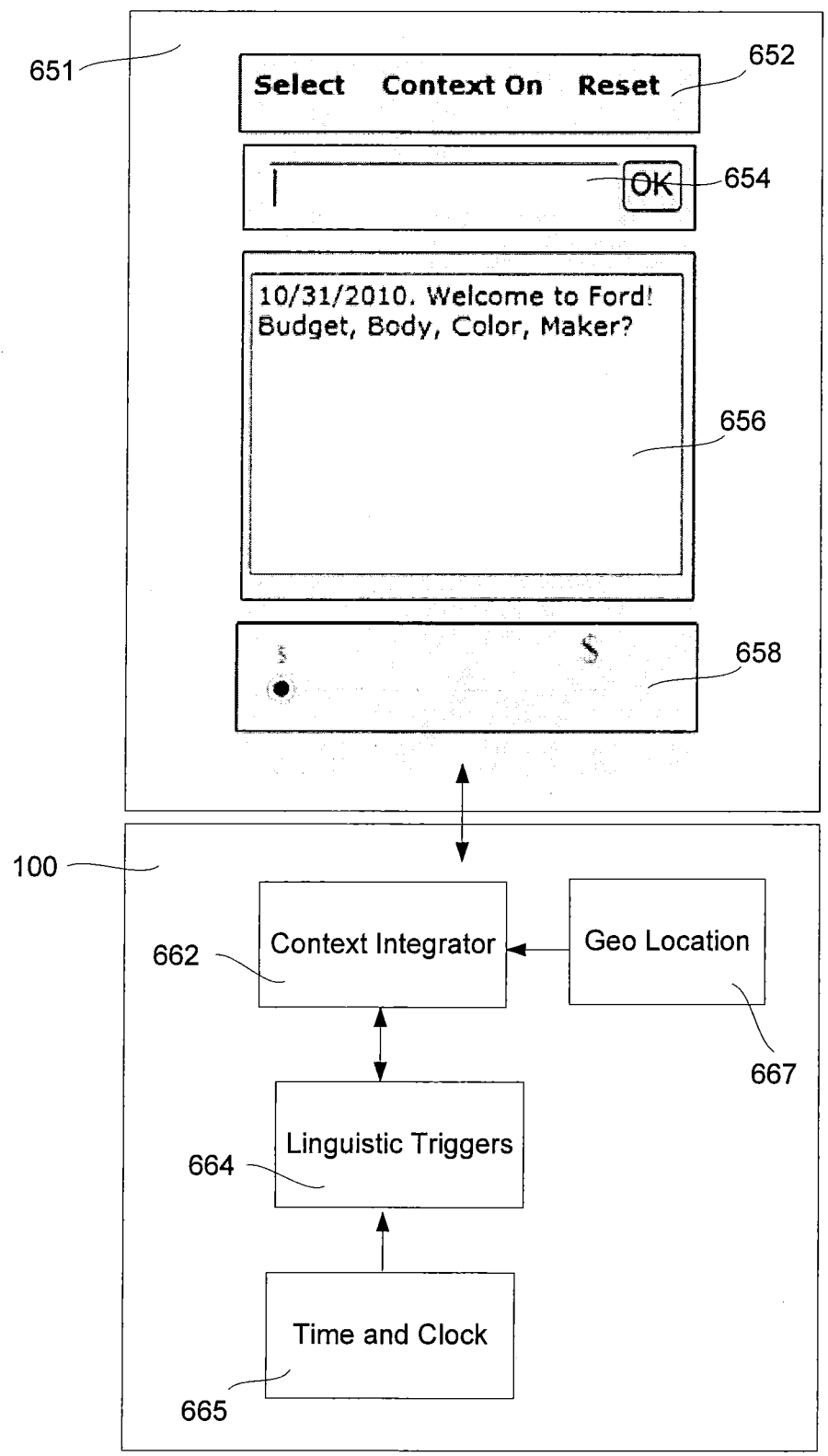
FIG. 12 illustrates an exemplary screen shot from a client device of one embodiment of the present invention.

FIG. 12 illustrates an exemplary screen shot from a client device 651 as provided at least by client component 208 and an application 100 which may be incorporated into various layers (components), including but not limited to presentation component 202 and client component 208. FIG. 12 represents a conversation between a user and the application. As illustrated, the screen shot of the client device includes a menu 652 that includes a "Select," "Context On," and "Reset" choice. Also included is an input 654 which could be a text or audio input. The screen also includes a prompt field 656 and a logical slider 658. The application 100 is shown including a context integrator 662, linguistic triggers 664, time and clock 665 and a geo location 667. The context integrator 662 integrates (combines) linguistic triggers values, with other traditional contextual available values such as geo location, time, season, etc. The linguistic triggers 664 are used to keep values of linguistic variables such as color, maker, etc. The time and clock 665 provides a timing signal to synchronize neuron's charge or discharge. In this example, the conversation between a user and the application is stored in the user's browser in a neural core. In some embodiments, all information (queries) changes in the neural core are stored on the browser of the user's device. Modern browsers can be considered to be mini operating systems (OS). Browsers include almost all main components of traditional OS such as an interpreter, a memory control system, an input-output system, a tasks management system, etc. Modern web technology implemented in most browsers such as Java Applets, Silverlight, HTML5, etc, allows for the saving of a web pages' internal data structure into the local computer file storage and also allows the reading of this stored data later by the same web page. This data storing ability is similar to storing cookies from the web page to the local computer. However the storage of data is more complex, requires a larger storage and is more secure. To create a neural network inside the user's computer, the XML document (for example, 860 of FIG.

21A) is loaded from the server and interpreted (for example, 880 of FIG. 21B) to build neural network with default states. During communication with the user, the neural network will change its states. The then current state of the neural network can be presented, as a similar XML document, but instead of default values, actual neuron states are used. Such an XML document can be saved into the local computer file storage. The next time a user initiates the search, in the same domain knowledge, the locally saved XML document would be used instead of loading a default XML document from the server. The saved state and all contexts and meaning of the neural network are restored from the local computer's XML document. Saving the neural core onto the local computer allows for keeping personal contexts (gained personal knowledge) away from the server therein protecting personal information (if the user decides not to share it) and at the same time allows for the restoring of contexts and uses during future sessions.

Figure 13:
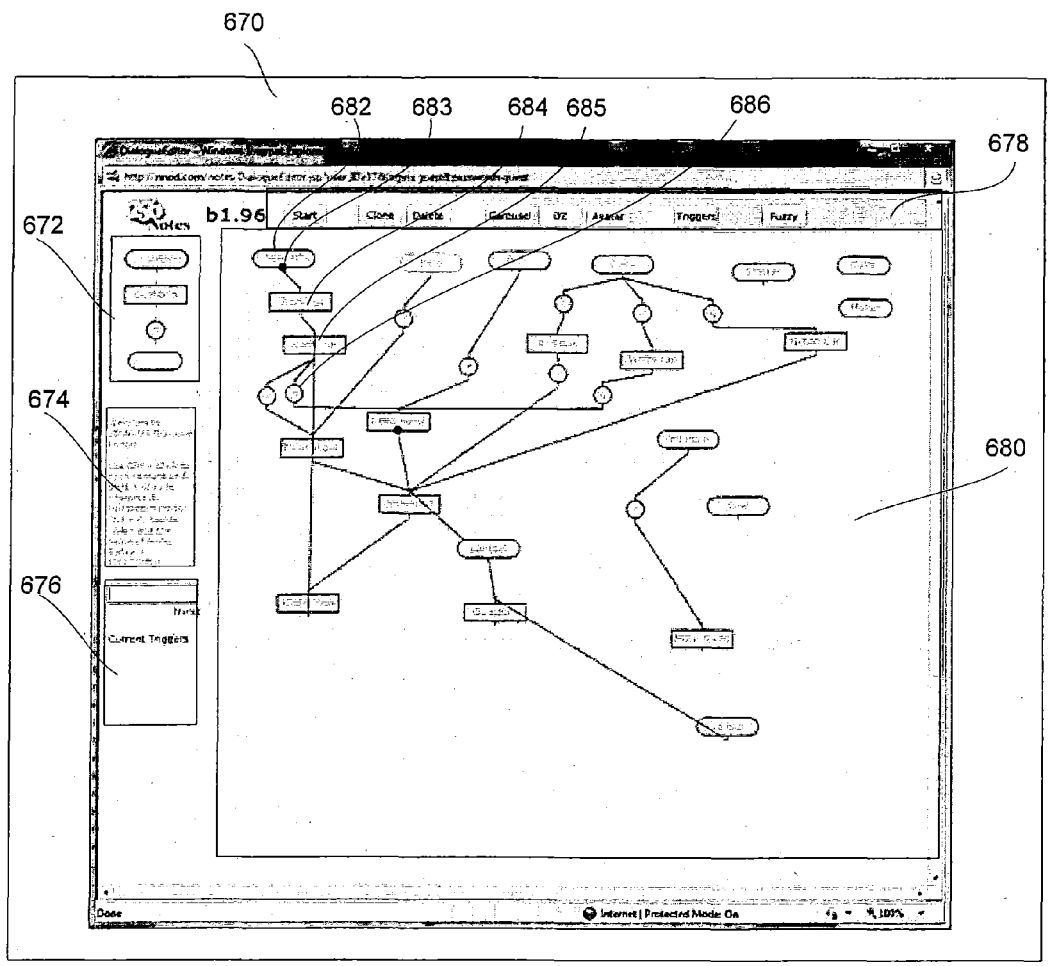
FIG. 13 is a screen shot of a neural dialog editor of one embodiment of the present invention.

FIG. 13 is a screen shot of a neural dialog editor 670 for search component 204. It represents the tool that the expert 632 would use to build the neural network. The neural dialog editor may incorporate a modified Petri network, as discussed below, to provide token-based asynchronous flow control and neural based recognizers to provide responses to user help or frequently asked question-type inquiries. The neural dialog editor 670 of this embodiment includes drag and drop library (stencils) of elements 672, which can be used to construct dialogues in a design working area 680. An output field 674 is used for testing, which will show the responses from inputs in the input field 676. The input field 676 is used to test the dialog model. Menu 678 provides various functions such as start dialog, open result window, save triggers, etc. Illustrated in the design working area is a plurality of starter dialog elements 682, prompt dialog elements 684 and semaphore dialog elements 686. A starter dialog element 682 will turn active (get the token) when a combination of input words reach the dedicated threshold level. A prompt dialog element 684 will be implemented as the next in a sequence of question/answer dialog. A semaphore dialog element 686 switches the flow based on the user's responses, such as "yes" or "no." A user's input triggers reaction from the neural core's dialog layer (produced by dialog editor 670). The user's input is just a sequence of words sent to the neural core by entering "return" or clicking a "submit button." These inputs will be interpreted by the neural core's dialog layer as "question", "answer", "statement" or just acknowledge and request more information ("next"). The prompt dialog element 684 is a sequential element which represents basic question/answer or group of answers. The following is an example of a dialog:

Neural core Q: "What is your name, please?"
User A: "Sergey"
Neural Core Q: "Good morning, Sergey!"

In this example, a first prompt dialog element 684 will hold the text "What is your name, please?" which will be presented to the user when the token 683 reaches prompt element 682. A second prompt element 685 will include a script calculating the time and generating the next prompt based on it.

Figure 14:
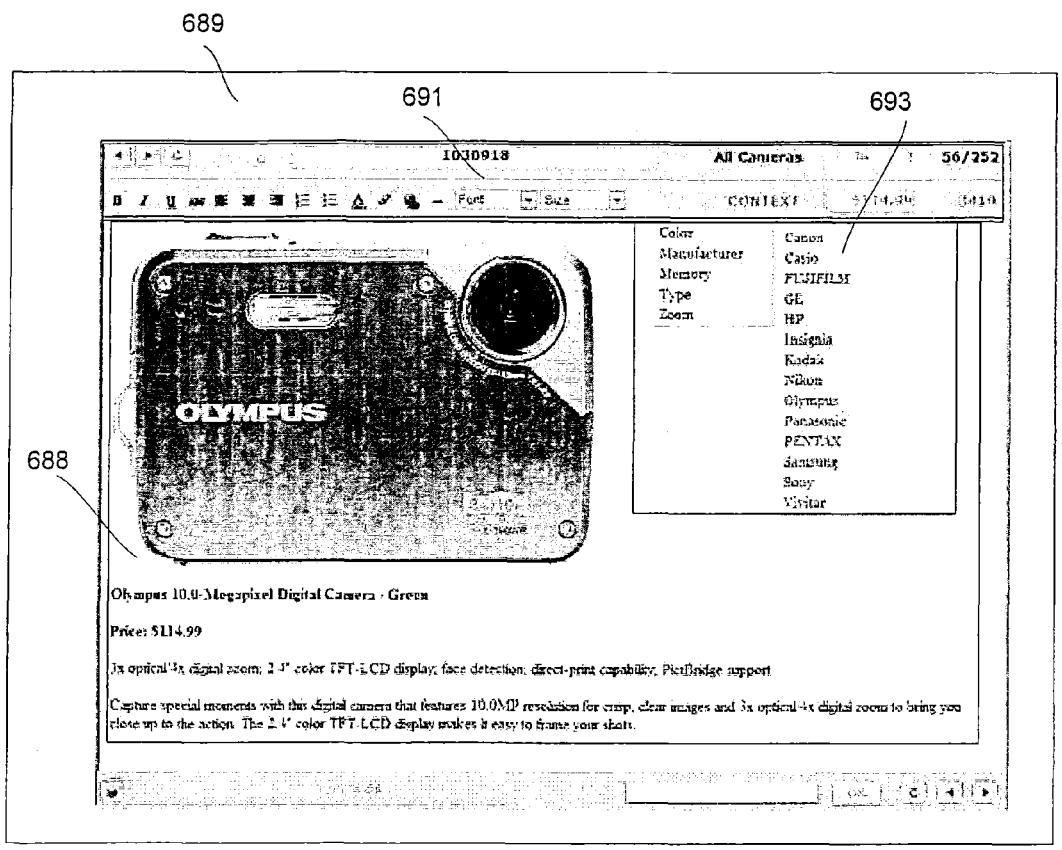
FIG. 14 illustrates an example of one data entry or "card" of an embodiment of the present invention.

FIG. 14 illustrates an example of one data entry or "card" 689 from a database as presented by various components 200, potentially including but not limited to presentation component 202, search component 204 and data organization component 206. In particular, data organization component 206 may manage many such "cards" and present individual ones as commanded by a user via client device 212 and client component 208. This data card 689 in this example includes a menu 691 with a variety of options and values such as card name, ID, number, etc. The data card 689 further includes contextual meaning (linguistic variables) and values 693 and texts 688 that define the item, which can be searched in "full text" mode. A data card 689 is a container of additional knowledge (linguistic or factual) associated with a particular item (object or service) a user is searching. The item is what the user wants to find (goods, documents, facts, etc.). Data cards 689 have meta-knowledge as well as dynamic data, scripts, etc.

Figure 15:
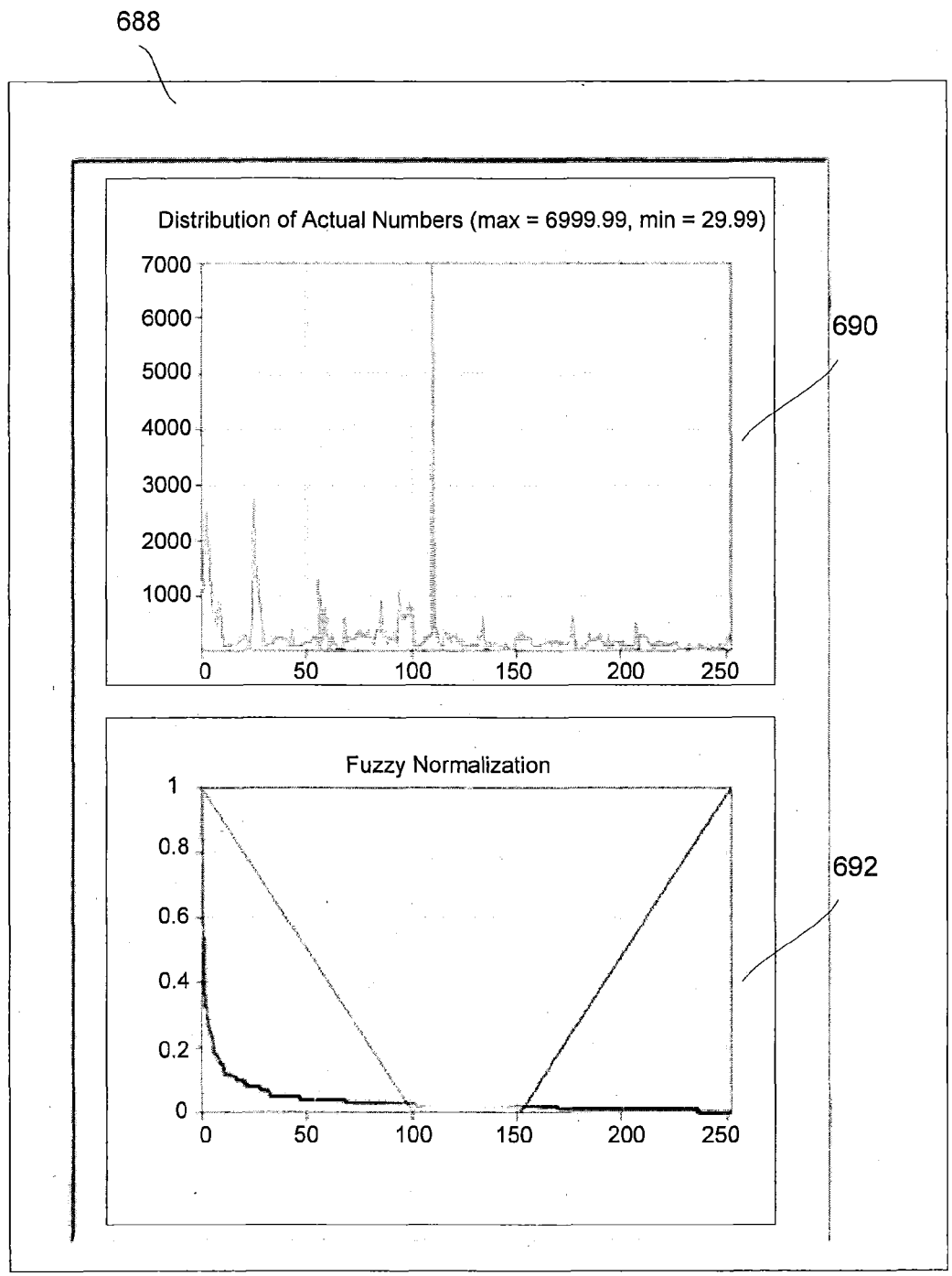
FIG. 15 illustrates exemplary fuzzy characteristics and how such characteristics are incorporated into a search of one embodiment of the present invention.

FIG. 15 shows a fuzzy logic calculator 688 with exemplary fuzzy characteristics and how such characteristics are incorporated into search. The application of the fuzzy characteristics provide a bridge between linguistics to numeric values. In the exemplary embodiment:

$$\text{Price-Norm}_i = (\text{Price}_i - \text{Min-Price})/(\text{Max-Price} - \text{Min-Price})$$

SELECT * FROM table
WHERE $KEY_i$ IS LIKE % $K_i$% ... AND ...
($FUZZY_i < F_i + \text{delta}_i$ AND $FUZZY_i > F_i - \text{delta}_i$) AND ...
where
$KEY_i$—the name of a field in the table of the base, containing key characteristics;
$K_i$—value of the characteristic (exact);
$FUZZY_i$—the name of a field in the table of the base, containing key characteristics;
$F_i$—value of the characteristic (washed away);
$\text{delta}_i$—a range of area in the dim characteristics.

Fuzzy logic calculator 688 provides mapping between linguistic and numeric values (Expensive is >$50K, Cheap is <$10K, etc.). The exemplary fuzzy characteristics of the fuzzy logic calculator 688 implement a triplet calculation to convert linguistic variables to numeric values for fuzzy requests such as "more" or "better." Numeric calculator 690 is used to find average, minimum and maximum and fuzzy calculator 692 provides definition for three areas: high, middle and low.

Figure 16:
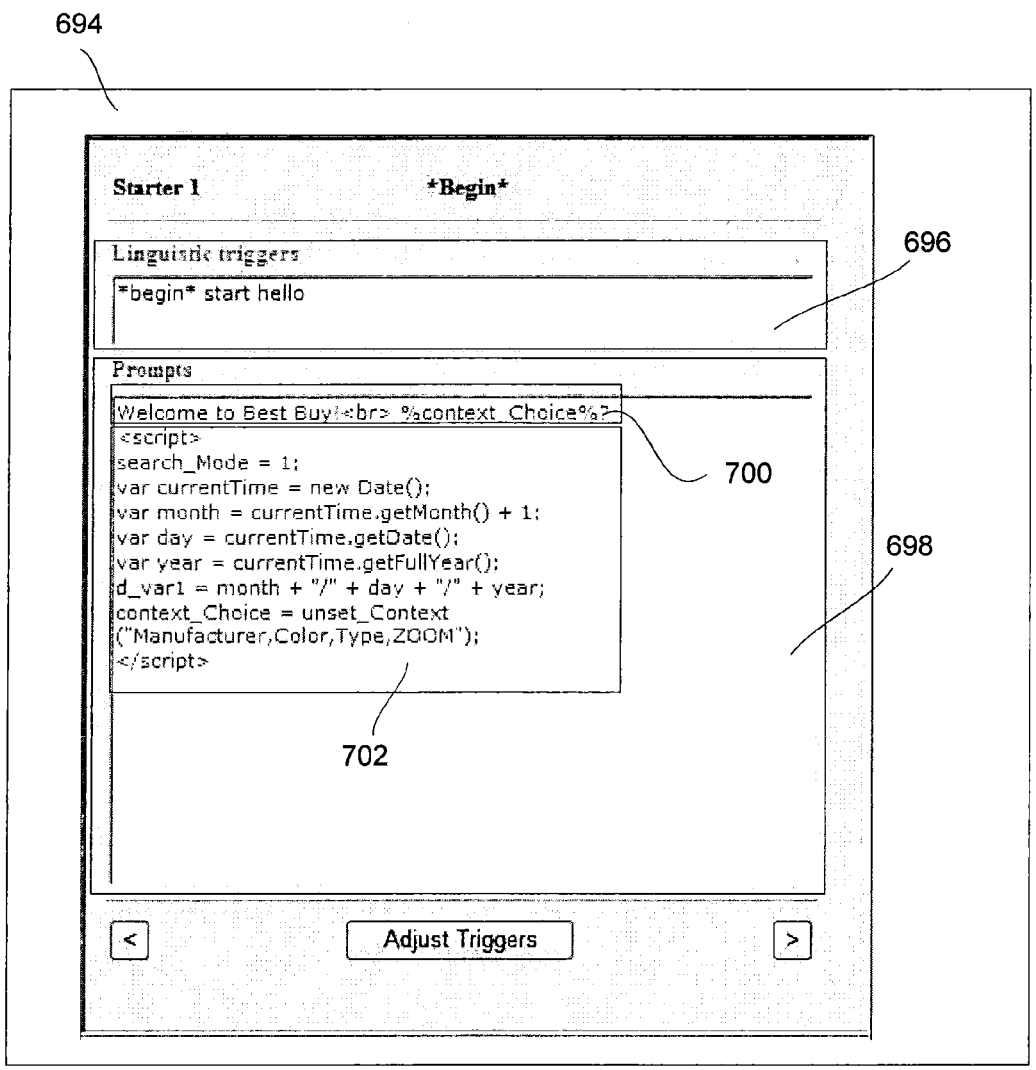
FIG. 16 illustrates a screen shot of an editor of one embodiment of the present invention.

FIG. 16 shows an editor 694 screen shot that would be used by every node in FIG. 13. This editor 694 shows formatting for presentation of data by presentation component 202. In this example, editor 694 includes an action card associated with dialog elements 689, 691 and 693 of FIG. 14. Words 696 in the editor 694 will trigger the dialog elements 689, 691 and 693. The editor 694 also includes an action field 698 and text 700 with meta tags which will be displayed as a result in the output element. In this example, editor 694 further illustrates a JavaScript instruction 702, which will be interpreted before the result would be presented and which may substitute meta tag in the above texts with dynamically calculated values.

Figure 17:
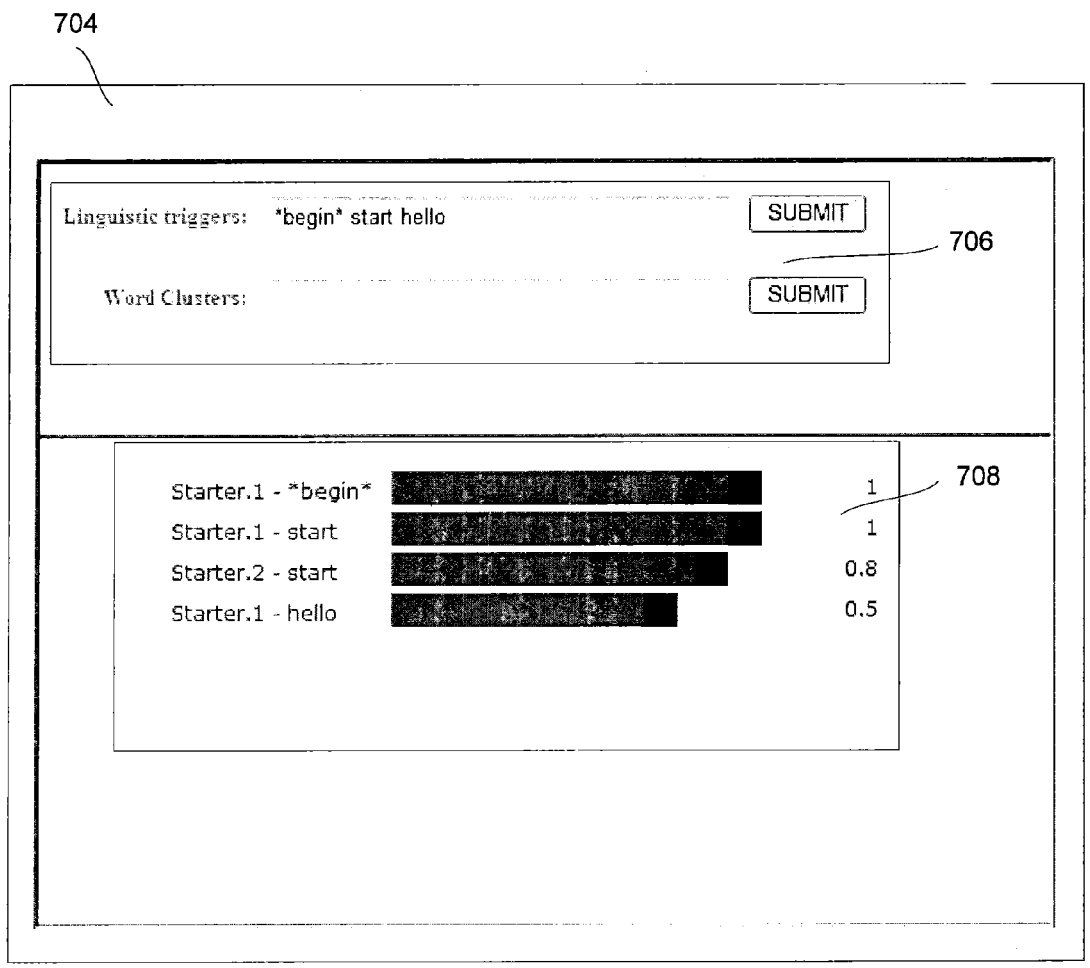
FIG. 17 illustrates the establishment of linguistic triggers for a neural network of an embodiment of the present invention.

FIG. 17 shows a weight assigning 704 screen shot illustrating the establishment of linguistic triggers for a neural network configured to provide for queries utilizing conversational language as described above. It shows how different weights are given to words to come up with the best match. The weight assigning 704 provides a manual assignment of weighs for input words. Input field 706 is used to find a pair word(s)—neuron(s) pair associations. Slider(s) 708 are used to assign expert weights to word(s)—neuron(s) pairs.

Figure 18:
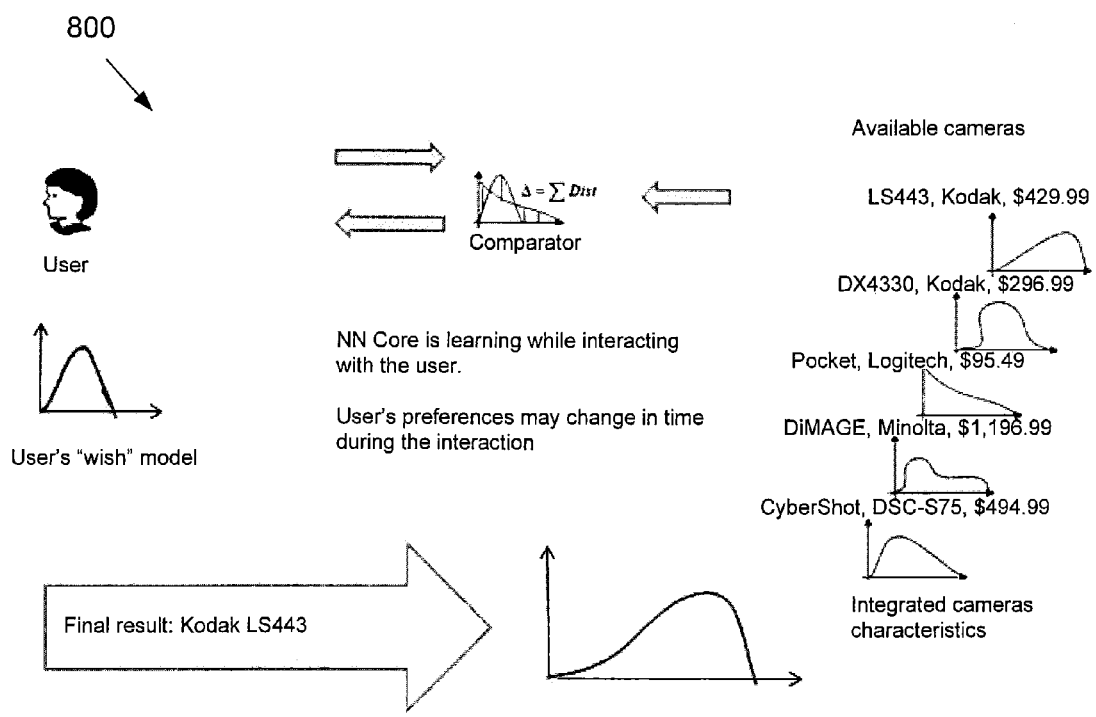
FIG. 18 illustrates a dynamic search diagram of one embodiment of the present invention.

FIG. 18 is a dynamic search diagram 800 that shows a certain process and mathematical steps for searching by search layer 204 based on a user query or queries. It shows a graphical curve that represents the consumer's multi-parameter wish list as it is compared to graphical curves of products to determine a match to provide to the consumer. During a search process, a user's input will change the state of the neural network 130. The neural network's state may be used as an input for traditional pattern recognition to find the nearest item belonging to a particular cluster. An initial training of pattern recognition model is based on data cards 689.

The initial training allows answering questions like "family car" or "find similar" etc.

Figure 19:
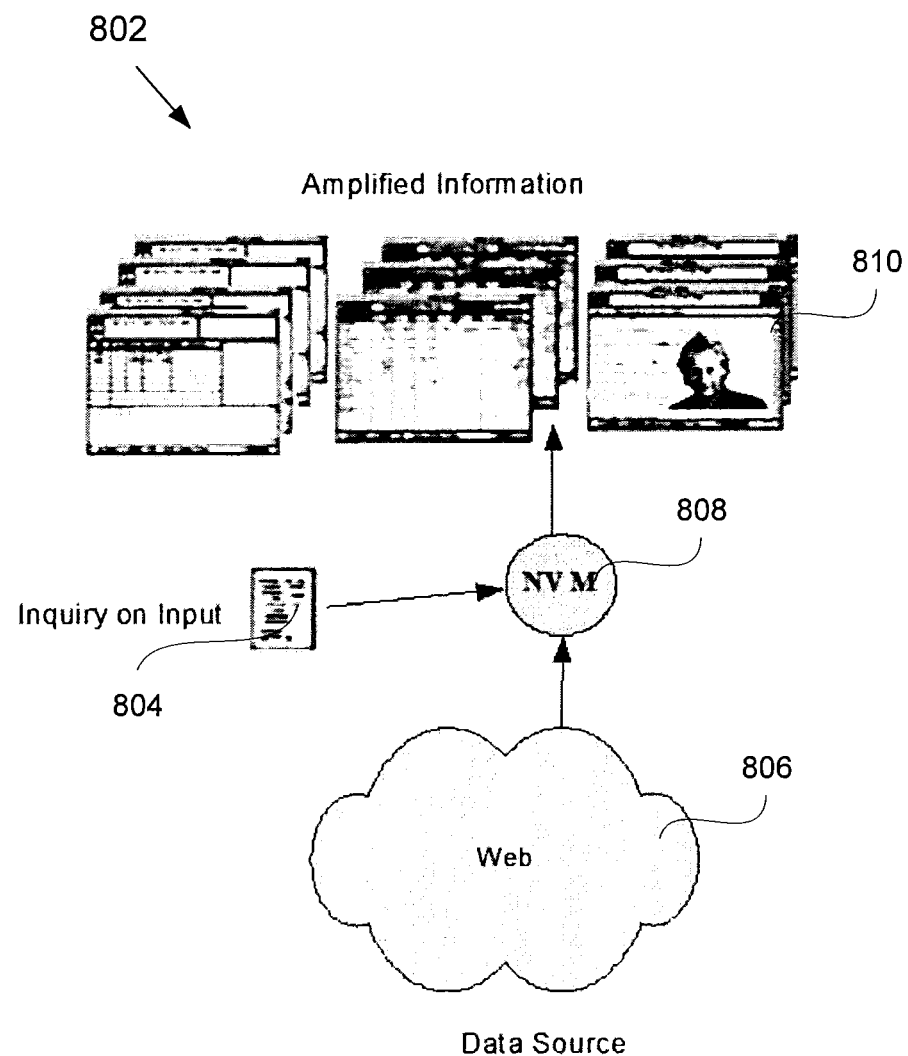
FIG. 19 illustrates an amplifying process diagram of one embodiment of the present invention.

FIG. 19 is an amplifying process diagram 802. The diagram 802 shows the contribution of an inquiry combined with data for display according to data organization layer 206. In this embodiment, the information gets clarified or amplified. That is, fuzzy information that comes into the amplifying process gets clarified. As illustrated, an inquiry is placed in input 804 which is processed by a neural virtual machine (NVM) 808 (or neural model). The NVM 808 is an element similar to an electronic amplifier, which transforms an input signal into an output signal. In this embodiment, an inquiry (fuzzy information) 804 is presented to the NVM 808. The NVM 808, using the source of data 806, clarifies the inquiry 804 and outputs it as amplified information 810.

Figure 20:
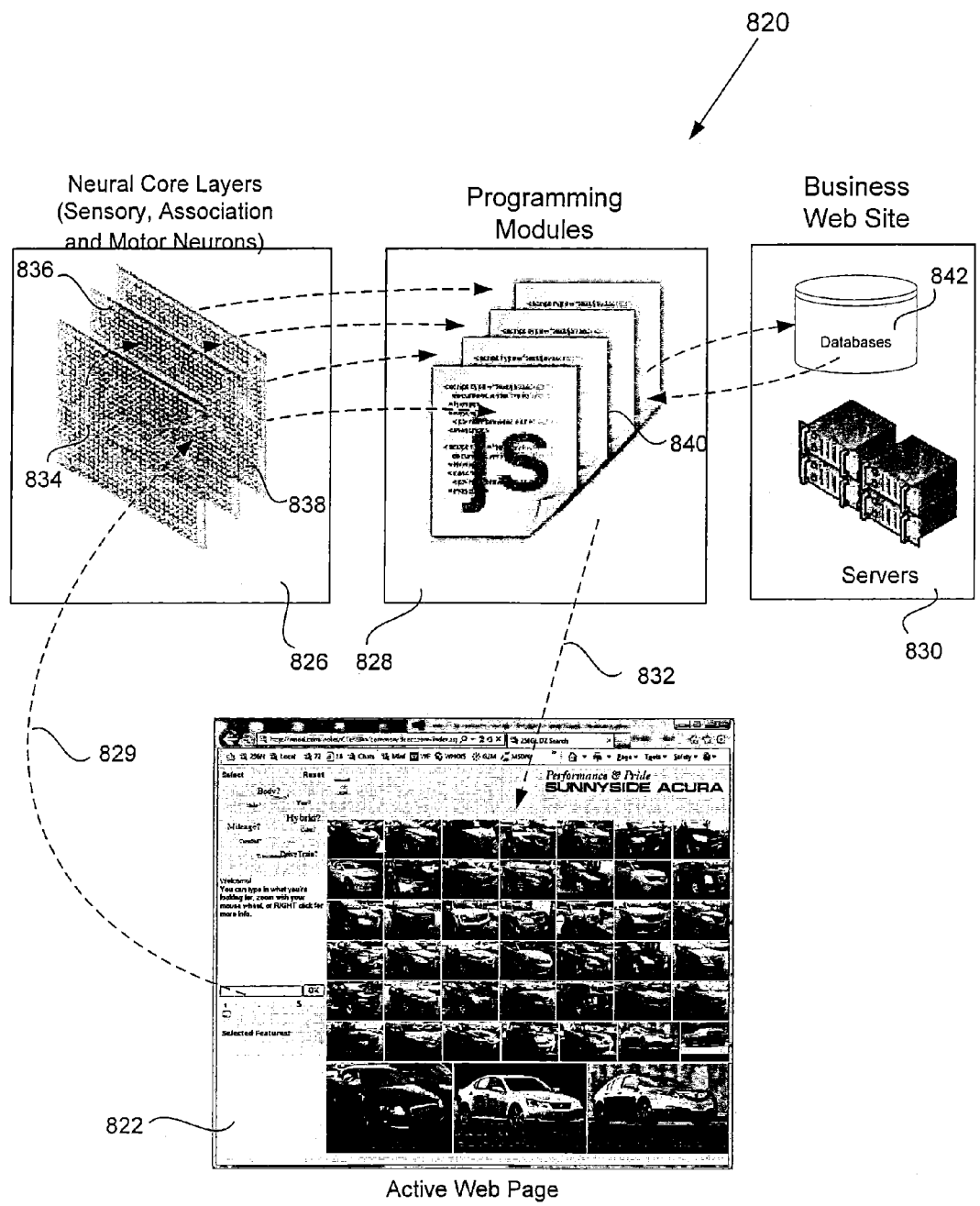
FIG. 20 illustrates an interface diagram of one embodiment of the present invention.

FIG. 20 is an interface diagram 820. Diagram 820 includes an active webpage 822 with inputs from where the user may enter the input informal requests 829. The informal requests. (queries) 829 which can be a continual conversational stream of words and click such as: "looking for a red used-car;" "can you show me a better one;" "I like this, show me a similar," etc. Diagram 820 illustrates a neural core 826. The neural core 826 is the interpreter of the neural network 130. The neural core 826 provides building, connection, signal propagation, timing and other functions required for the neural network 130. The neural core (model) 826 takes the informal requests and converts them into actions. In particular sensory layer 834 of the neural core 826 includes neuron inputs that are connected to receive the requests 829 as streams of words and convert them from text form into the form of neuron states and propagated signals. An association layer 836 within the neural core 826 includes interconnected neurons where logical analysis and contextual memory is located. Association layers are so called "hidden" layers, which provide the main logic for calculating, holding, changing and forgetting meanings. The neural core 826 further has a motor layer 838 with neuron outputs connected to an external library of programming modules 828. The function of the neuron outputs is to keep a value (from −1 to +1) which is interpreted by correspondent programming module 840 as input parameters for calculations. Output from the motor layer 838 of the neural core 826 is provided to the programming modules 828. The programming modules 828 are a set of functions 840 written in JavaScript or any other programming languages such as C#, PHP, Java, etc. which can be activated by calls from neurons from motor layer 838 and which can interact with business Web server 830 to access data in database 842. The business website 830 includes dynamic content that allows access to the internal businesses data. New content 832 generated as a result of the root user's request are provided to the active webpage 822.

Figure 21B:
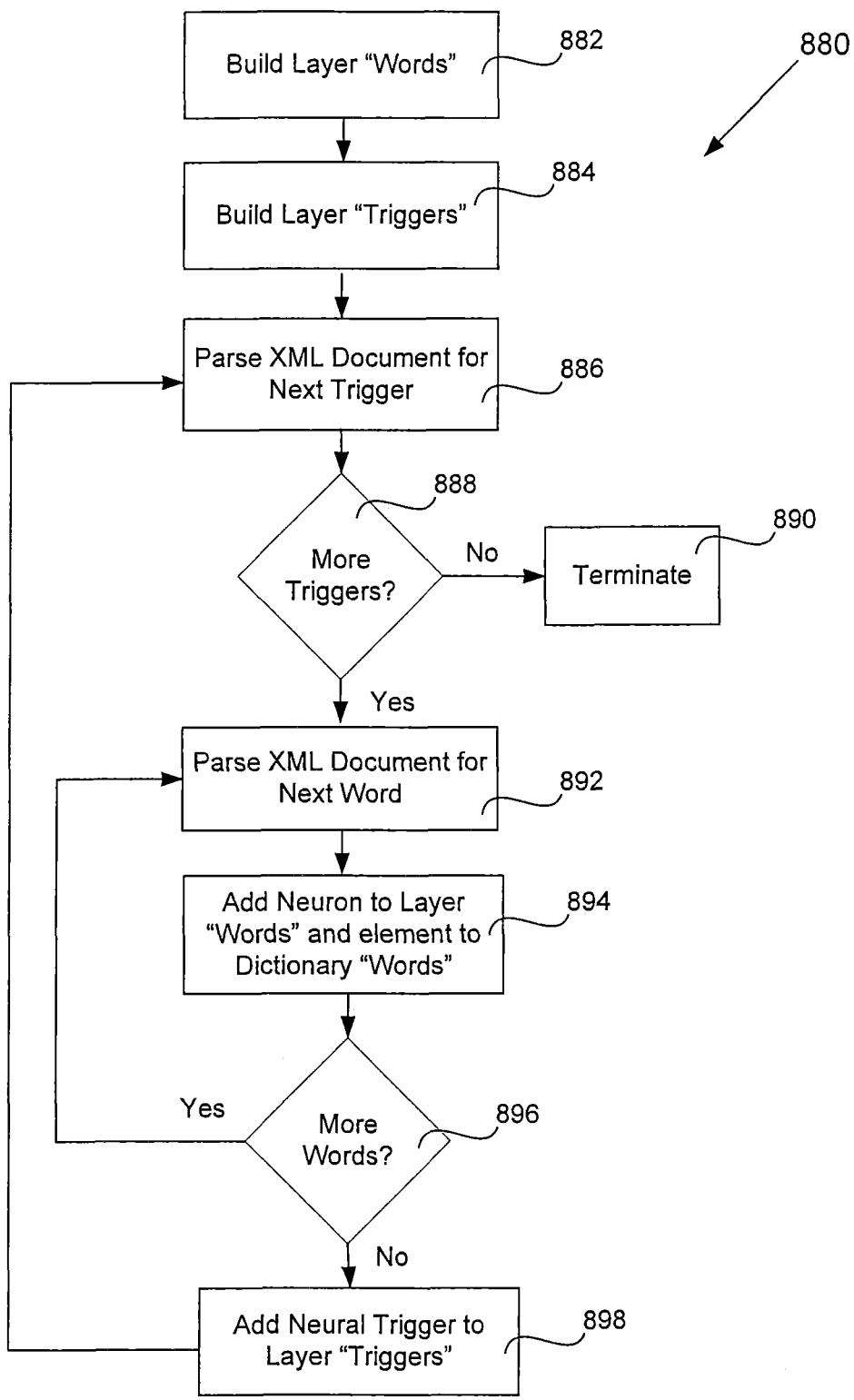
FIG. 21B illustrates a building flow chart of an embodiment of the present invention.

FIG. 21A is an example of an XML definition of linguistic and fuzzy elements. In the example, XML instructions 860 (XML document) allow for the automatic building of basic neural structures such as "linguistic triggers and "fuzzy linguistic variables" used for contextual searches. A parser and builder 862 reads the XML instructions 860 and builds neural triggers 863 in a first neural layer 864 and fuzzy linguistic variables 865 in a second neural layer 866. The building flow chart 880 of FIG. 21B further discusses this process. The process starts with a build layer "words" at step (882). In step (882) a list of words are entered such as colors associated with "red." Next, build layer "triggers," are formed at step (884). The triggers are associated with the words such as triggers associated with the word "red." Neural triggers are structures that keep contexts, meanings, linguistics states and other attributes of a search. They can be dynamically modified by adding and deleting states, change weights and timing parameters in neurons. The XLM instructions are parsed at step (886). XML parsing is a well known procedure in modern programming languages, which extracts all items, attributes and elements from a XML Document, and presents them in the form of variables of standard types such as STRING and INTEGER. It is then determined if there are more triggers at step (888). If there are no other triggers, the process terminates at step (890). If there are more triggers at step (888), the XML Document (or instructions) are parsed for the next word at step (892). A neuron element is added to a neural layer called "words" and correspondent text representing the word is added to the internal dictionary at step 894. It is then determined if there are any more words at step (896). If there are not any more words at step (896), neural triggers are added to the layer "trigger" at step (898) and the process then continues at step (886). If are more words at step (896), the process continues at step (892).

Figure 22A:
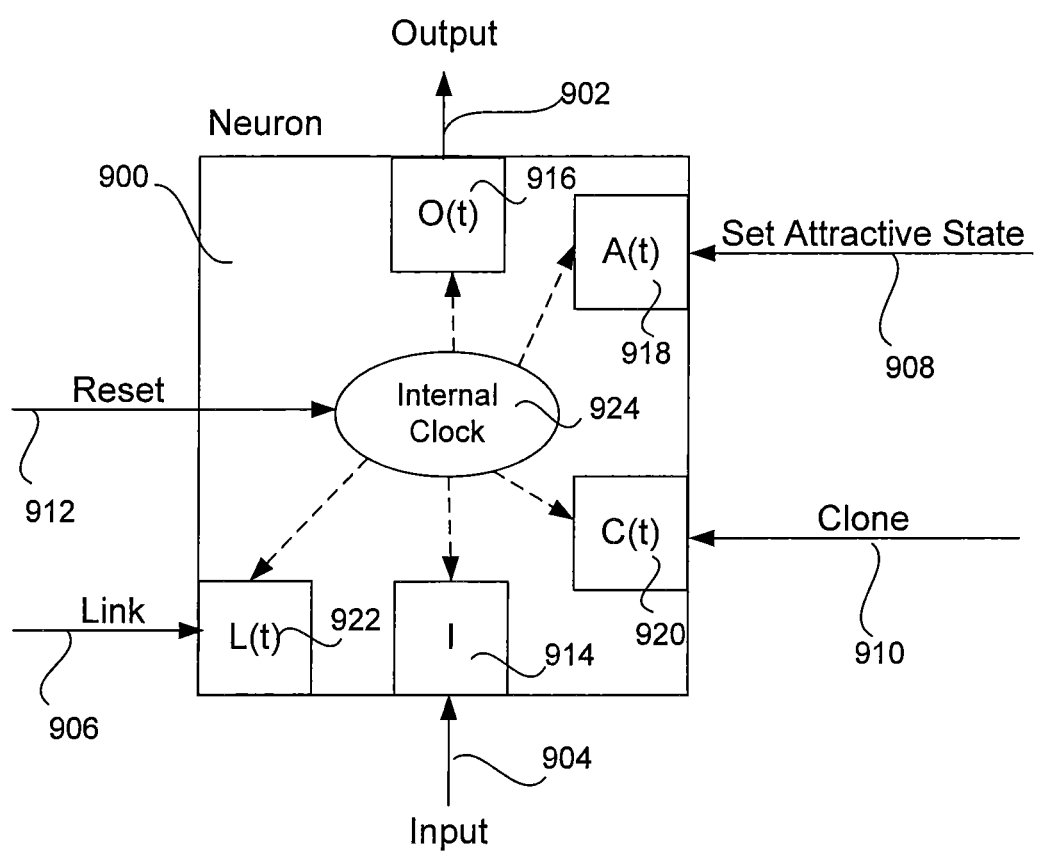
FIG. 22A illustrates a structure of a neuron of an embodiment of the present invention.

FIG. 22A illustrates the structure of a neuron 900 of an embodiment. A neuron 900 is a fundamental building element. A neuron has a unique combination of internal properties for collecting and processing input signals from connected neurons or from programming modules, providing outputs for propagation to other connected neurons or programming modules, attracting connections from other neurons, connecting to other neurons, and cloning. Moreover, the neurons have a charge/discharge mechanism as discussed below. Neuron 900 can be implemented as a real physical device or as a virtual object in a software environment. In a virtual implementation there is an external process that updates and interprets the clock object 924 which will update internal states and propagate signals though connections, 902, 904, 906, 908, 910 and 912. Output 902 provides an output value that is accumulated (stored) in the object 0(t) 916 and is ready for propagation to another object. Input 904 receives a signal input value that is stored on object 914. The internal clock function 924 uses the value stored on the object 914 for propagation to output 0(t) 916. Input signal link 906 turns neuron 900 into an actively seeking mode to find and establish connections with other neurons while object L(t) 922 has charge. Object is a well-known element in modern programming languages, which combines data structure with associated procedures, can be implemented for a variety of operations on this data structure. Input signal attractive 908 will have a value that is stored in attractor object A(t) 918 and will mark this particular neuron as "ready for link" with other neurons. Input signal clone 910 sets up the time in object C(t) 920 when this neuron 900 should clone (replicate) itself and should create another neuron with the same properties. Cloning allows for the expansion of the neural network by adding elements. Because cloning can be the result of an internal state, the neural network can add new elements or structures like triggers without external programming influence. Input signal reset 912 resets all internal states and properties of the neuron 900 into their defaults. Internal object "I" 914 holds the value on input signal 904 for further propagation. Internal object O(t) 916 holds the value of output signal 902 for further propagation. This object 916, may discharge its value on time based on the function preloaded into the internal clock 924. The internal object A(t) 918 holds a value which could be used to connect neurons. This value will mark this neuron 900 as "ready for link." This object may discharge its value on time based on the function preloaded into the internal clock 924. The internal object C(t) 920 holds the value that can be used to clone neurons. When this value reaches a threshold level the neuron 900 will create a copy of itself. This object may discharge its value on time based on the function preloaded into the internal clock 924. The internal object L(t) 922 holds the value that can be used to connect neurons. When this value reaches a threshold level, this neuron 900 will try and connect itself with all other neurons marked as "ready to link." This object may discharge its value on time based on the function preloaded into the internal clock 924. The internal clock (internal object) 924 controls timing and discharging processes inside the neuron.

Figure 22B:
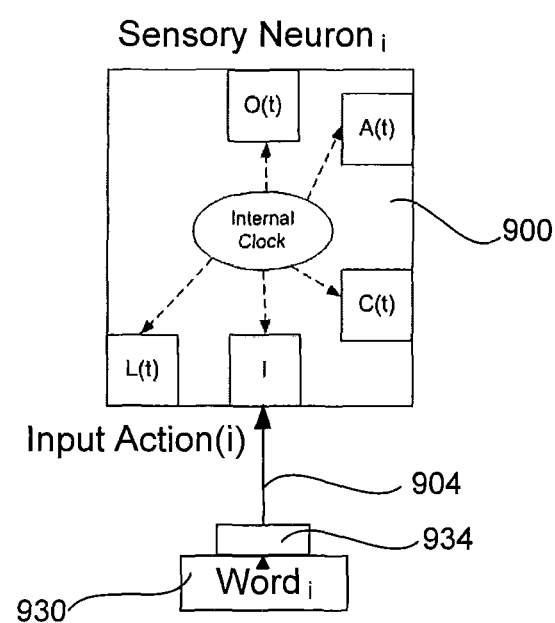
FIG. 22B illustrates how a word interacts with the neuron of an embodiment of the present invention.
Figure 22C:
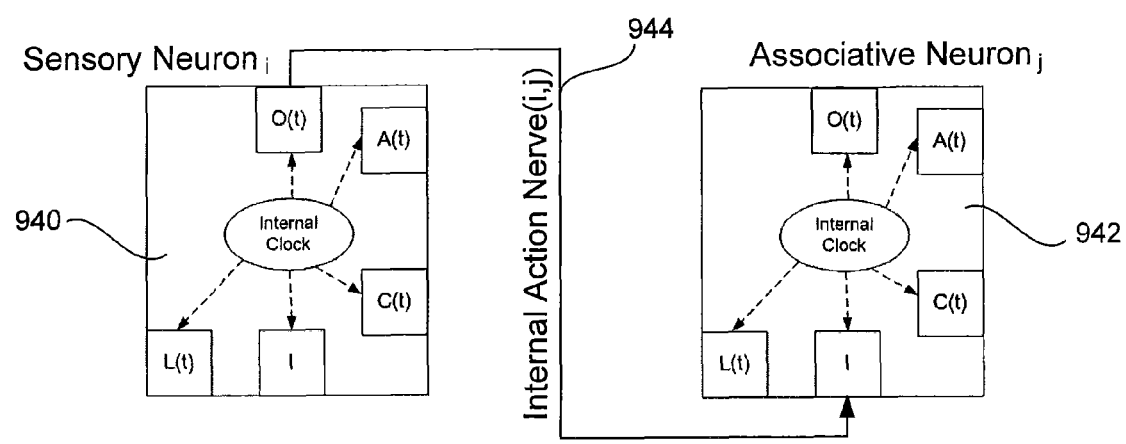
FIG. 22C illustrates a linking of a first neuron and a second neuron of an embodiment of the present invention.
Figure 22D:
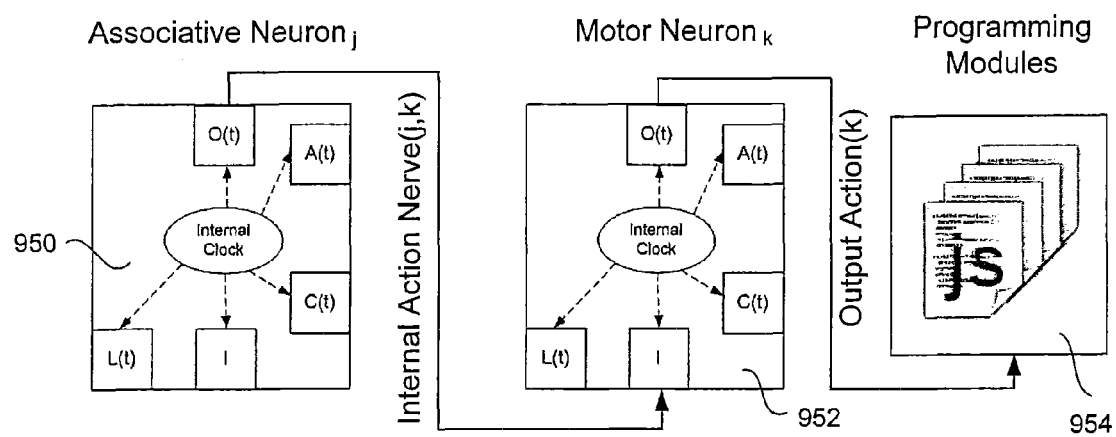
FIG. 22D illustrates an associate neuron, a motor neuron and programming modules of an embodiment of the present invention.

Referring to FIG. 22B an illustration of how a word interacts with the neuron 900 is illustrated. As discussed above, the sensory neuron 900 aggregates input stream and delivers internal signals to associative neurons for further analysis and decisions. The word 930 is a self-completed structure which could be a single linguistic word or special sequence representing events such as a "click," "geo-location," "time," etc. A procedure interface 934 converts the word 930 into the input signal 904. This input signal 904 may be implemented as a TCP listener or JavaScript function. A special dictionary of pairs "word-neuron ID" allows for the finding of an appropriate neuron to couple the input signal to the neuron's input. A dictionary is a fundamental programming structure that allows the use of operators such as W=DICTIONARY>FIND_ELEMET_AT( . . . )). FIG. 22C illustrates the linking of a first neuron 940 and a second neuron 942. The first sensory neuron 940 specializes in aggregating an input stream and delivering internal signals to the second associative neuron 942 for further analysis and decisions. As illustrated, a signal from the object O(t) of the first sensory neuron 940 is delivered to the internal object (I) of the second neuron via communication path 944. The second neuron 942 (located at Association Layer) specializes in analysis and decisions. FIG. 22D illustrates an associate neuron 950, a motor neuron 952 and programming modules 954. Associative neuron 950 is specialized in analysis and decisions. The motor neuron 952 specializes in providing signals for calls of a correspondent function from an available set of programming modules 954. The set of programming modules 954 perform a variety of functions such as: "select data from the database," "store current context," "generate help answers," etc. The output of the motor neuron 952 is provided to the programming modules 954. This input into the programming modules may be implemented as TCP send or call to a JavaScript function. The special dictionary pairs "action-neuron ID" allows finding appropriate programming module and sending the signal to its input or calling it.

Figure 23:
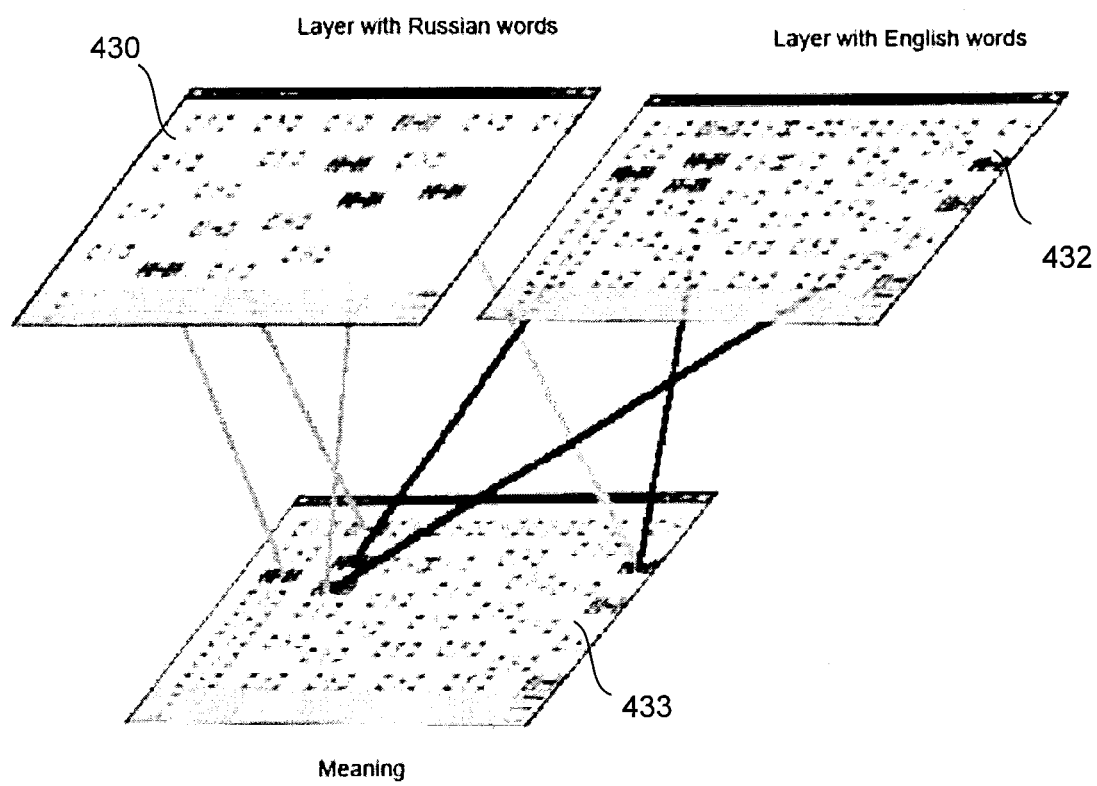
FIG. 23 illustrates the relationship of processing using an application of an embodiment of the present invention.

FIG. 23 illustrates the relationship of processing using application 100 for the display of data. In this example, we show three layers, two sensory layers 430 and 432 (English Words and Russian Words) and one association layer 433 of meaning. When input word(s) activate corresponding neurons on sensory layers 430 and 432 associated neurons will propagate signals to the Association Layer 433. For example, the word "red" in English and the word "красный " in Russian have the same meaning as the color. Association layer 433 will hold the meaning of the color for sensory layers 430 and 432 that is independent of the language used (i.e. English or Russian).

Figure 24:
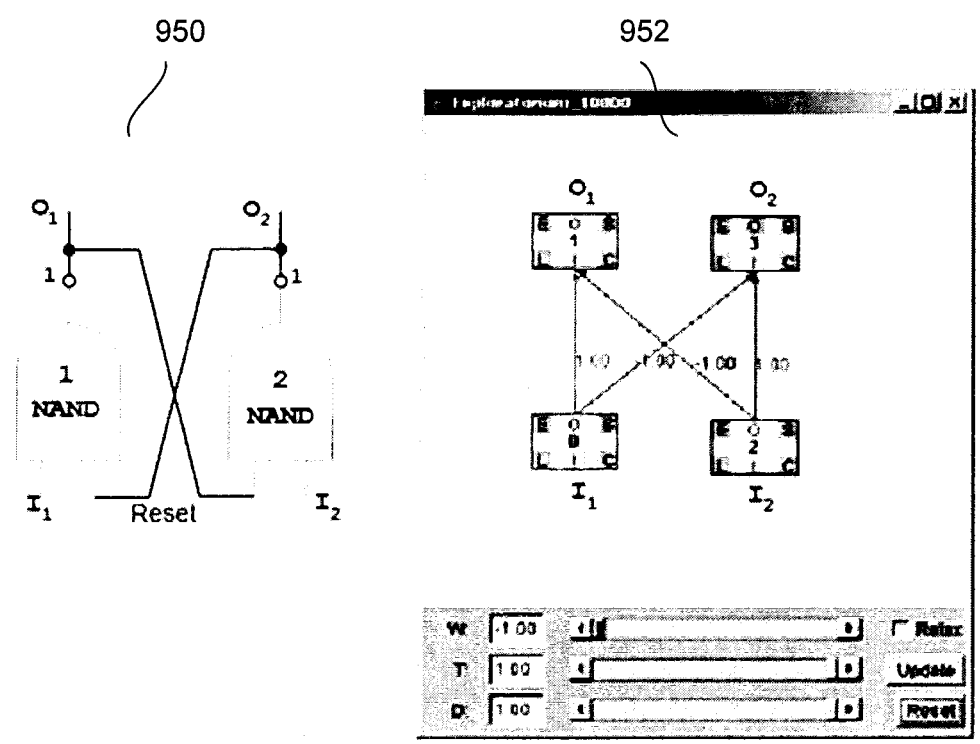
FIG. 24 illustrates a model of a neural network linguistic trigger of an embodiment of the present invention.

FIG. 24 illustrates a model of a neural network linguistic trigger providing searching functions based on an input of conversational language. FIG. 24 illustrates a flip-flop 950 with two states. Neural trigger 952 similar to electronic flip-flop 950 is implemented by using Neurons 900 (illustrated in FIG. 22B). A basic neural trigger 952, of an embodiment, is implemented with four neurons and has all outputs connected with correspondent inputs with a pair of connections with weights symmetrically opposite (−1, +1; +1, −1). Such structure allows changing the state of neural trigger 952 based on the input.

Figure 25:
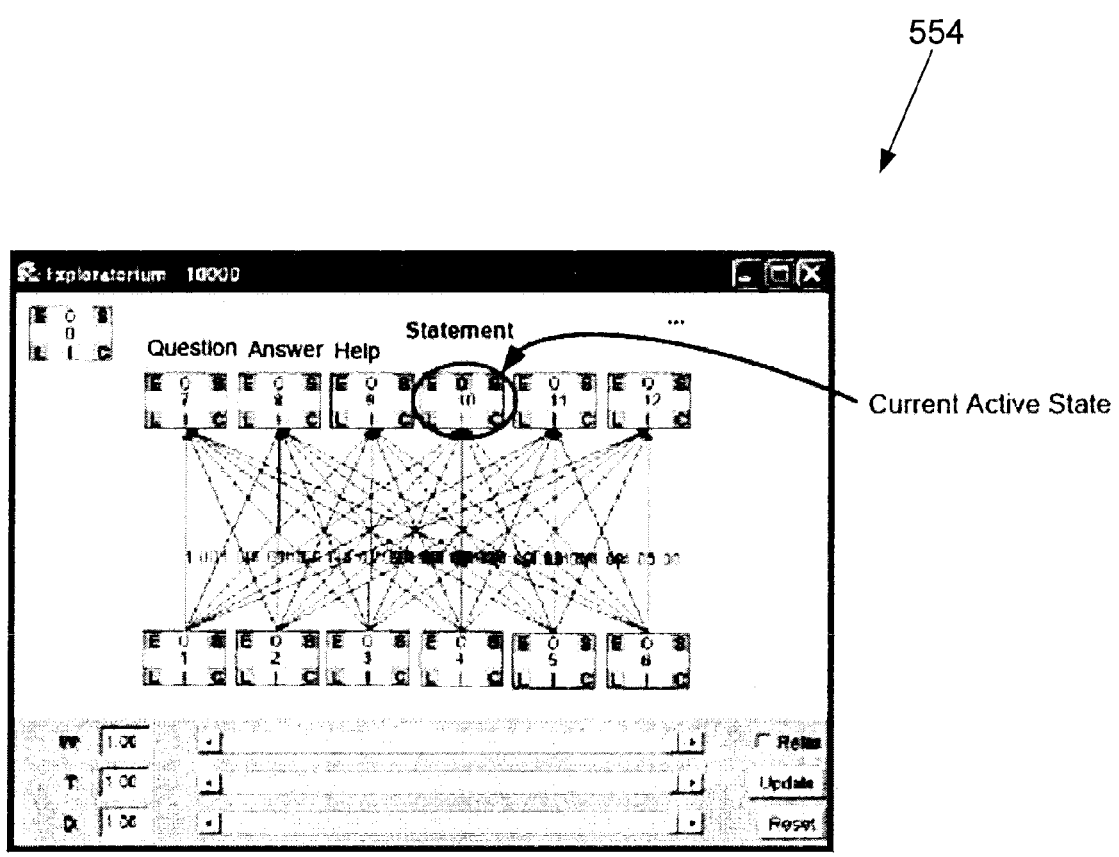
FIG. 25 illustrates a linguistic trigger with six states of an embodiment of the present invention.

FIG. 25 illustrates an example of the linguistic trigger 554 having six possible states. A neural trigger with n-states allows for the keeping of variable amount of outputs. This number may be dynamically changed by adding or deleting elements from the trigger. In this example, neural trigger 554 presents the state of conversation, for example, "user may ask the question and expect the answer", "user may answer previous question and wait", "user asked for help", etc.

Figure 26:
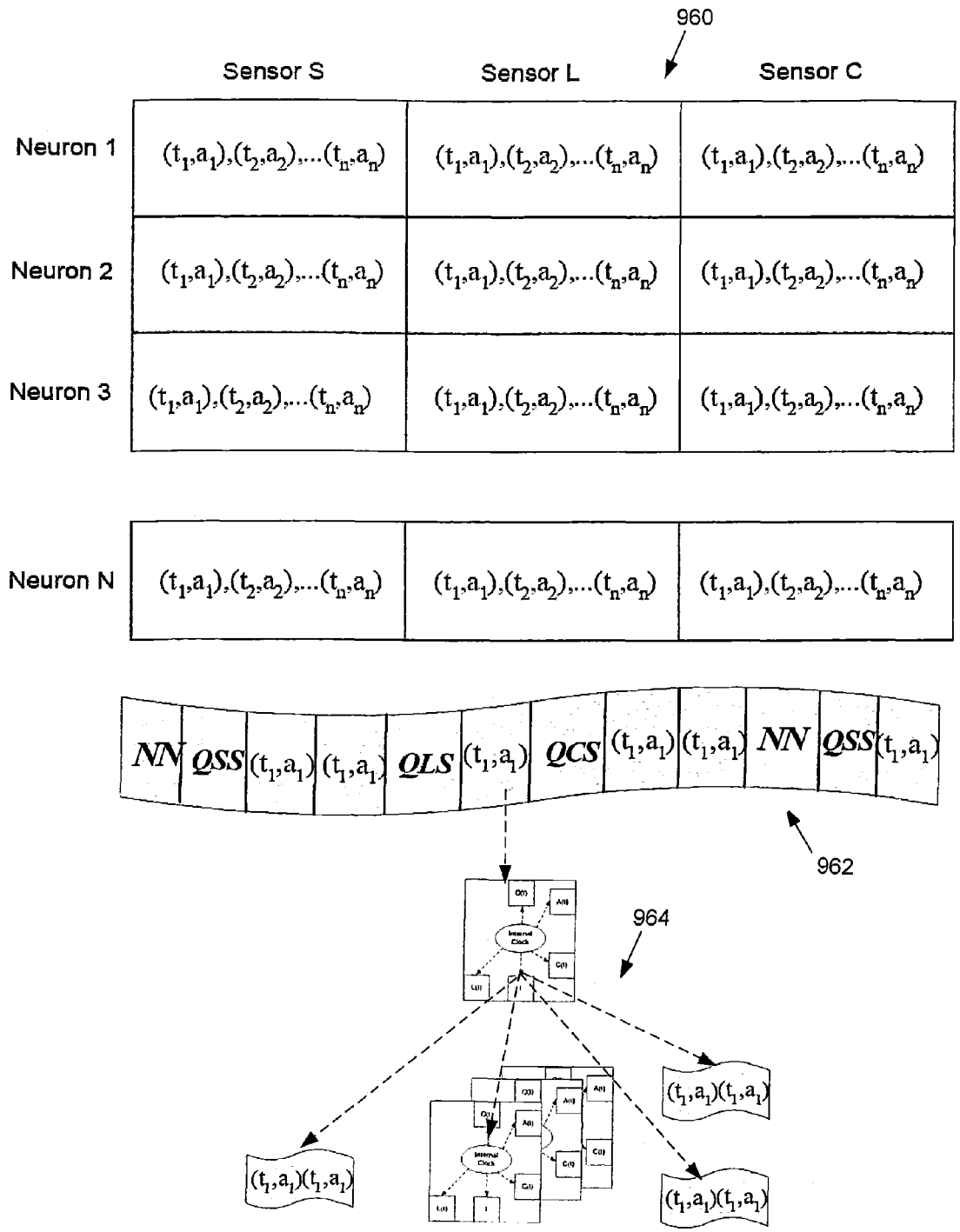
FIG. 26 illustrates a component of a model of timing sequences in a neural network of an embodiment of the present invention.

FIG. 26 illustrates a component of a model of timing sequences in a neural network. Any neuron 900 (illustrated in FIG. 22B) may be loaded with a sequence of time base events such as "turn yourself in attractive mode at time t1 until t2," or "at time t3 connect yourself with any available for connections neurons," etc. Timing table 960 is an example of design logic of such timing sequences. Timing table 960 is converted into the "tape" 962 which can be read by a particular neuron 964 and as the result, this neuron 964 will link itself to other neurons to form a useful structure. Timing is for the internal states for attraction, forgetting, excitement and other states implemented in a neuron 900.

Figure 27:
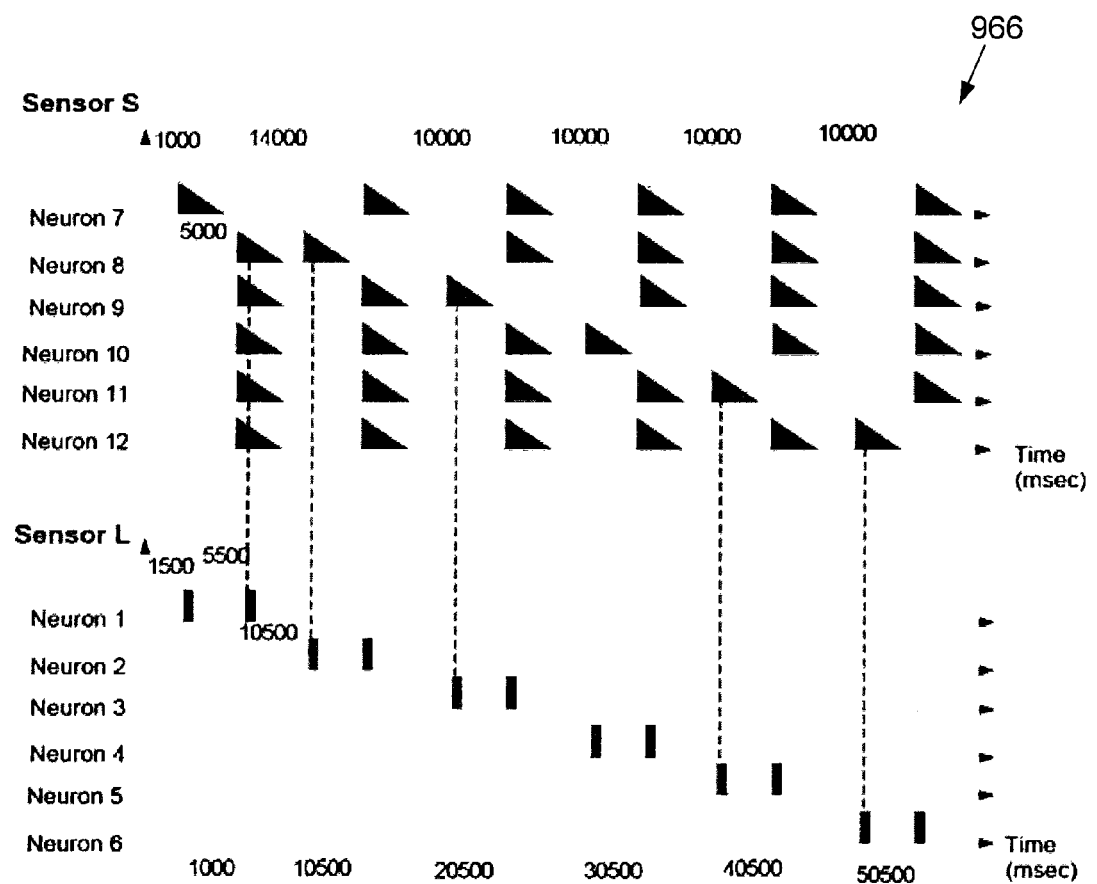
FIG. 27 illustrates a time synchronization diagram of an embodiment of the present invention.

FIG. 27 illustrates an example of a time synchronization diagram 966 to construct neural linguistic triggers with six possible states. In this example, two groups of neurons are organized to form a neural linguistic trigger with 6 states. To build such a structure, every input of neurons (1, 2, 3, 4, 5, 6) must be connected with every association neurons (7, 8, 9, 10, 11, 12) in such a way that when one connection from a neuron holds positive weight+1 and five others connections hold negative weight −1. In this example, neuron 7 was preloaded with a timing sequence which triggers it to the state "ready for connection" at time 1000 msec. In 5000 msec. this state will be discharged. Preloaded sequence of time based events for neuron 1 will trigger its "link to others with weight+1" at 1500 msec. Neuro Neurons 1 and 7 will be connected with positive weight. Neurons 8, 9, 10, 11, 12 were preloaded with event "ready for connection" at 10500 msec. and neuron 1 "link to others with weight −1" at 10600 msec. When these events happen, neuron 1 will be connected to neurons 8, 9, 10, 11, 12 with negative weight −1.

Figure 28:
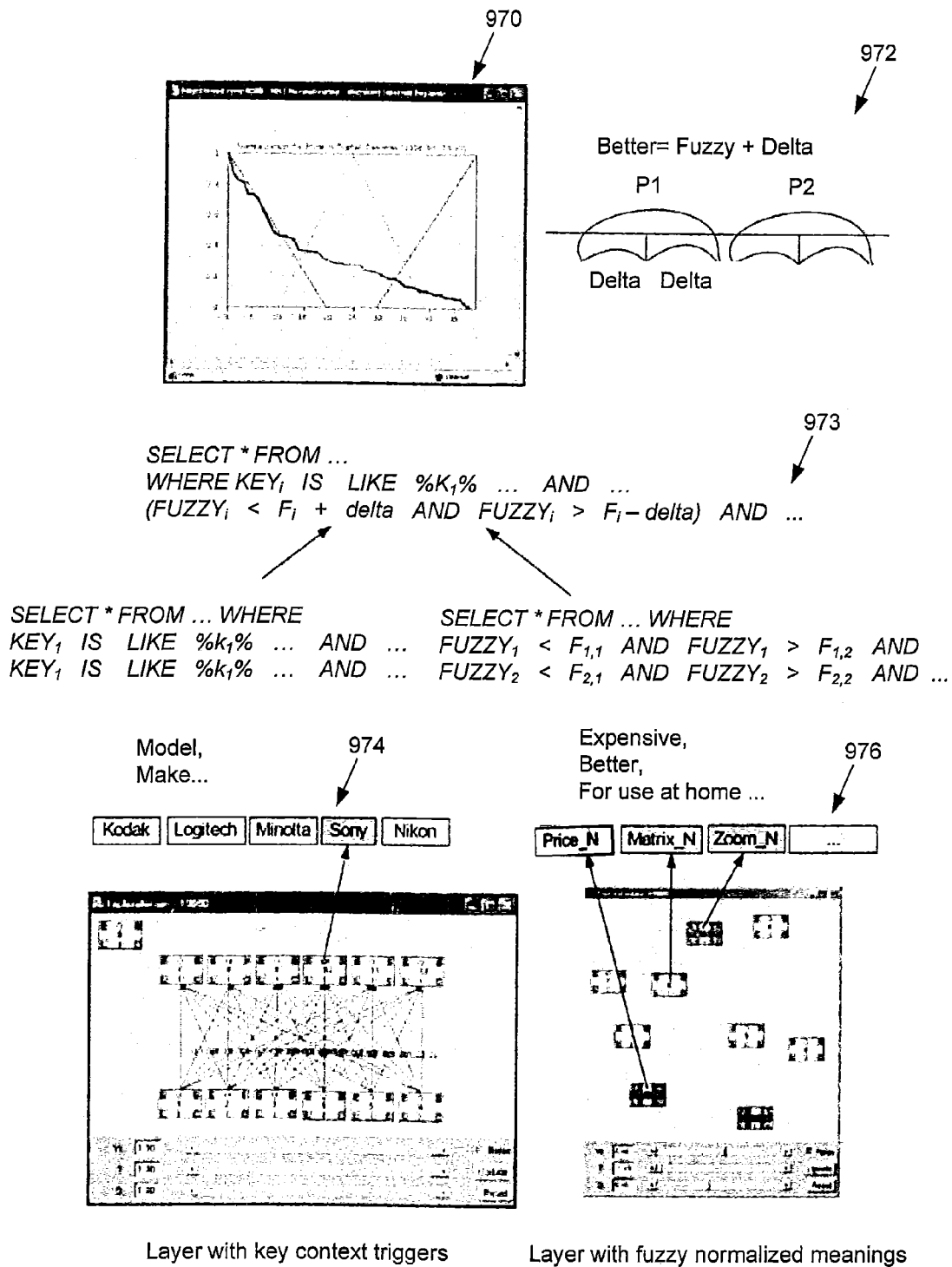
FIG. 28 illustrates implementation contextual parameters based on linguistic triggers and fuzzy variables to generate the query to a SQL database with traditional data of an embodiment of the present invention.

FIG. 28 illustrates an example of implementation contextual parameters based on linguistic triggers and fuzzy variables to generate the query to an SQL database with traditional data. Fuzzy calculator 970 links a numeric value of a particular item to its fuzzy linguistic variable. This calculator 970 may hold position of user's input such as "average", "low" or $45K. Delta shift 972 allows implementing linguistic shifts in the value such as "better", "less", "around", etc. by providing the +/−proximity to current value. Linguistic Neural Triggers 974 may hold the value of such meanings as "make", "model", "color", etc. A layer of fuzzy normalized meanings 976 holds values of fuzzy neurons for such things as "Price", etc. The values of fuzzy calculator 970 and delta shift 972 together with values from neural triggers 974 and fuzzy neurons 976 are integrated into a SQL query 973. In particular, FIG. 28 illustrates one method to convert a neural network's state into standard SQL queries.

Figure 29:
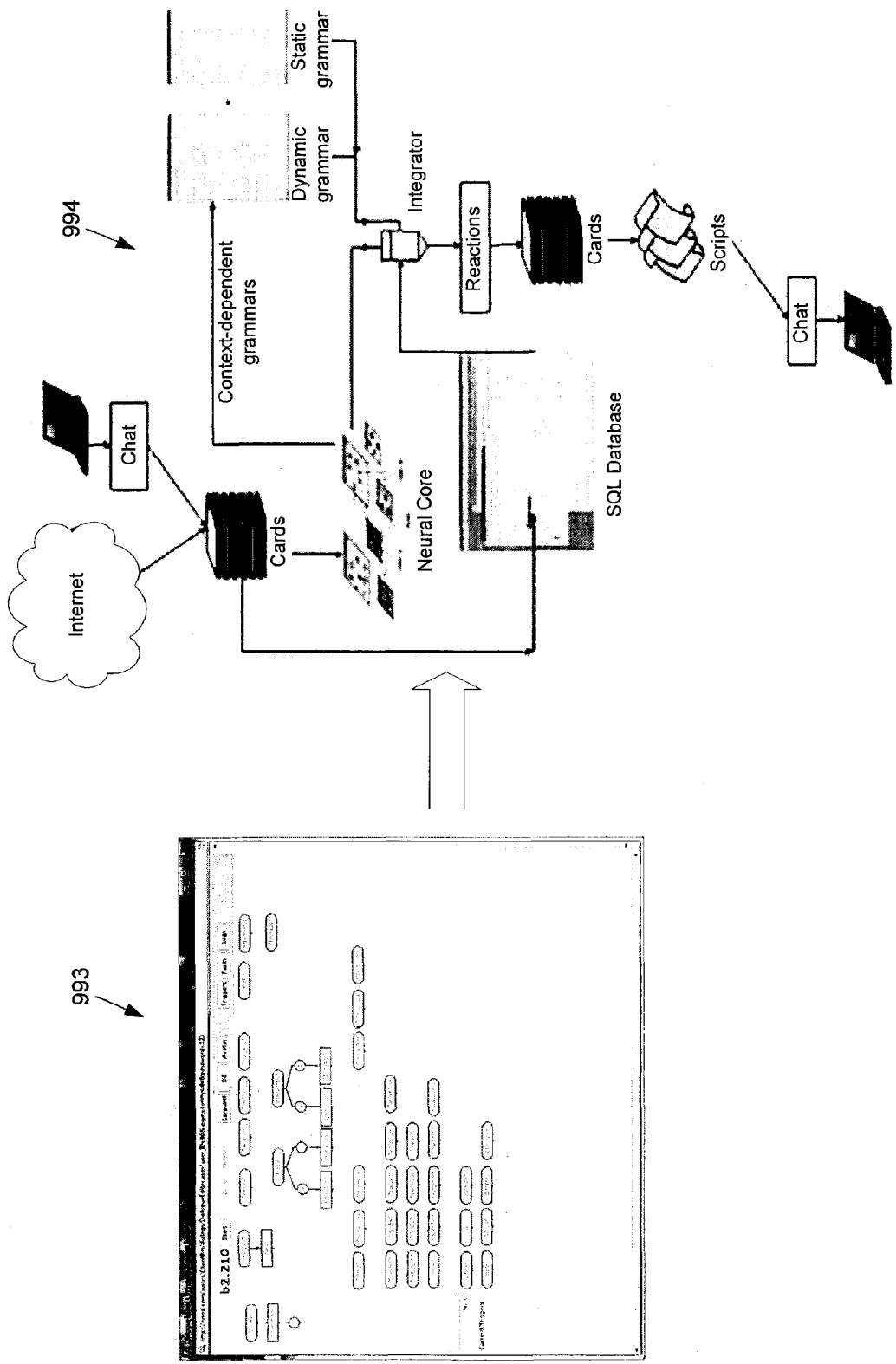
FIG. 29 illustrates a search component of a search function of an embodiment of the present invention.

FIG. 29 illustrates a search component 204 search function. Searches using search component 204 may utilize the functions as disclosed above. In addition, search component 204 may utilize a Petri network as known in the art. The Petri network may be combined with a neural network of search component 204 to combine the functionality of both Petri network and a neural network. In particular, the use of Petri network may assign tokens to each query starting point to manage the interaction between different paths of the network, as shown. As known in a Petri network, a sufficient number of tokens must be assigned to a given path in the network to permit the search function to proceed down the path. The use of a Petri network in the non-binary relationships of a neural network may provide advantageous and efficient search functionality in search component 204. Neural Editor 993 (such as neural editor 670 of FIG. 13) provides experts with the tool to build and integrate a dialog model together with contextual neural model 994 into the application 102. As discussed above, in an embodiment the neural editor 993 is based on a modified Petri Net flowchart builder, which converts a resulting flowchart into the neural network 130. The neural editor 993 is used by an author (expert) to design prompts and answers. The resulting neural network consists of neurons 900 that are interpreted by the neural core 826 during a search session in the user's computer.

As stated above, the methods and techniques described here are implemented by application 100 of FIG. 1. Embodiments of application 100 may be implemented in digital electronic circuitry, or with a programmable processor (for example, a special-purpose processor or a general-purpose process such as a computer) firmware, software, or in combinations of them as may be present on electronic components described herein. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; memristers; and CD-ROM disks. Any of the foregoing may be supplemented by, or incorporated in, specially-designed application-specific integrated circuits (ASICs).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method of providing information to a user, the method comprising:
    establishing an user system interface between a client device and an information system;
    processing informal queries input to the client device by the user with at least one neural network that converts the informal queries into formal queries based at least in part on a knowledge expert;
    creating interface context when converting the informal queries into the formal queries with the neural network, the created interface context changing the state of the neural network;
    storing the interface context in a local computer file storage of the client device, the storing of the interface context in the client device keeping personal information in the interface context secure from the information system, the interface context aiding in the determination of future formal queries from future informal queries;
    searching at least one database in response to the formal queries; and
    providing responses to the informal queries processed by the neural network to a user through the client device.

2. The method of claim 1, wherein establishing an user system interface between a client device and an information system, further comprises:
    providing an unique identifier with a presentation component to be displayed on at least a first output device with an application;
    capturing the unique identifier with a client device;
    sending the captured unique identifier to the application;
    matching the unique identifier; and
    establishing an interface between the at least one output device and the client device based on the matched unique identifiers with the application.

3. The method of claim 1, further comprising:
    creating the at least one neural network with a neural editor that at least in part provides a tool for the knowledge expert to build the neural network.

4. The method of claim 3, wherein creating the at least one neural network with the neural editor further comprises:
    creating an initial informal knowledge model using cases, diagrams and flow charts which are converted into a neural model of the neural network;
    creating common and specific linguistic knowledge and help to convert the initial informal knowledge model into the neural model used by the neural editor; and
    using the neural model and the neural editor to develop formal queries to deep web databases and incorporate all specifically designed interfaces from an active webpage on a client side to a server side.

5. The method of claim 1, wherein processing informal queries input to the client device with at least one neural network that converts the informal queries to the client device into formal queries, further comprises:
    implementing a neural core interpreter loaded onto a browser of the client device.

6. The method of claim 5, wherein implementing the neural core interpreter loaded onto a browser of the client device, further comprises:
    selectively connecting neurons, wherein each neuron includes internal properties for collecting and processing input signals; and
    selectively charging and discharging neurons.

7. The method of claim 5, further comprising;
    timing internal states for each neuron.

8. The method of claim 5, wherein implementing the neural core interpreter loaded onto a browser of the client device, further comprises:
    implementing a neural editor to design prompts and answers;
    implementing cards containing additional knowledge;
    implementing neural triggers to keep attributes of a search; and
    implementing a SQL query generator to convert neural networks states into standard SQL queries.

9. The method of claim 8, wherein implementing the neural core interpreter loaded onto a browser of the client device, further comprises at least one of applying a fuzzy logic calculator that associates numeric values with linguistic variables and implementing pattern recognition.

10. The method of claim 1, wherein storing the interface context in a local computer file storage of the client device further comprises;
    storing neuron states in a XML document in a local computer storage file of the client device.

11. A method of creating an information system, the method comprising;
    loading a neural core on a browser of a user device, the neural core being an interpreter for a neural network;
    interpreting a user query entered into the user device with the neural network;
    accessing a deep web in determining a response to the user query; and
    providing the response to the user query on an output device.

12. The method of claim 11, further comprising:
    storing the neural core in the user browser to be used for future queries.

13. The method of claim 11, further comprising:
    creating an initial informal knowledge model using cases, diagrams and flow charts which are converted into a neural model of the neural network;
    creating common and specific linguistic knowledge and help to convert the initial informal knowledge model into the neural model used by the neural editor; and
    using the neural model and the neural editor to develop formal queries to the deep web database and incorporate all specifically designed interfaces from an active webpage on a client side to a server side.

14. A method of forming an user system interface, the method comprising:
    providing a unique identifier with a presentation component to be displayed on at least a first output device with an application;
    capturing the unique identifier with a client device;
    sending the captured unique identifier to the application;
    matching the unique identifier; and
    establishing an interface between the at least one output device and the client device based on the matched unique identifiers with the application.

15. The method of claim 14, further comprising:
    utilizing at least some of a functions of the application with the client device upon the establishment of the communication link.

16. The method of claim 14, wherein sending the unique identifier further comprises:
    transferring the unique identifier from the at least one first output device to at least one second output device when the client device is moved to interact with the at least one second output device.

17. The method of claim 16, further comprising:
    providing a new unique identifier to the first output display after the transfer so a different client device can establish a communication link with the first output device.

18. The method of claim 14, further comprising:
    processing an input query from the client device with a client component; and
    incorporating the query within the context of a user of the client device's use of the application with the presentation component.

19. The method of claim 18, further comprising:
    searching at least one deep web database with a search component on the basis of the query processed by the client component and the context as established by the presentation component with a neural network.

20. The method of claim 19, further comprising:
    displaying information returned from the search component on the at least one output device with a data organizing application.

\* \* \* \* \*